United States Patent [19]
DeVeau

[11] Patent Number: 5,708,741
[45] Date of Patent: Jan. 13, 1998

[54] METHOD AND APPARATUS FOR COUPLING OPTICAL FIBERS TO AN OPTICAL INTEGRATED CIRCUIT

[75] Inventor: George Frank DeVeau, Cumming, Ga.

[73] Assignee: Lucent Technologies Inc., Murray Hill, N.J.

[21] Appl. No.: 580,419

[22] Filed: Dec. 28, 1995

[51] Int. Cl.⁶ .................................................. G02B 6/30
[52] U.S. Cl. ............................................................ 385/49
[58] Field of Search .................................. 385/14, 49, 37, 385/50, 36, 130, 128, 142, 144; 156/633.1, 643.1, 657.1, 659.11, 662.1; 65/403, 419, 24, 36, 61, 182.1; 359/900

[56] References Cited

U.S. PATENT DOCUMENTS

| | | | |
|---|---|---|---|
| 3,871,935 | 3/1975 | Gloge et al. | 156/158 |
| 4,046,454 | 9/1977 | Pugh, III | 350/96 |
| 4,116,532 | 9/1978 | Hubbard et al. | 350/96.21 |
| 4,379,771 | 4/1983 | Snyder | 264/1.5 |
| 4,636,033 | 1/1987 | Gagen | 350/96.21 |
| 4,662,713 | 5/1987 | Davies et al. | 350/96.2 |
| 4,735,677 | 4/1988 | Kawachi et al. | 156/633 |
| 4,750,799 | 6/1988 | Kawachi et al. | 385/14 |
| 4,762,387 | 8/1988 | Batdorf et al. | 350/96.2 |
| 4,865,407 | 9/1989 | Suzuki et al. | 385/31 |
| 4,973,126 | 11/1990 | Degani et al. | 350/96.21 |
| 5,111,518 | 5/1992 | Okada | 385/14 |
| 5,125,057 | 6/1992 | Aberson, Jr. et al. | 385/65 |

Primary Examiner—Akm E. Ullah

[57] ABSTRACT

This invention is directed to a apparatus for coupling an optical fiber end holder at houses an end portion of one or more optical fibers in a spaced arrangement, to respective optical waveguides coupled to an optical integrated circuit (OIC) housed in an OIC unit. The apparatus includes a bridge member situated to extend across an interface between end surfaces of the holder and the unit. The apparatus also includes a shim layer with a first side that contacts the bridge member and a second side that contacts portions of the holder and the unit adjacent their respective ends surfaces. The shim layer, when in its uncured, liquid state, allows the ends of the optical fibers and the optical waveguides exposed in the ends surfaces of the holder and unit, respectively, to be aligned. In its cured, sold state, the shim substance fixes the postional relationship of the holder and the unit relative to the bridge member and thus also fixes the alignment of the end of the optical fiber relative to the optical waveguides. Preferably, a refractive index matching substance is situated between the ends surfaces of the unit and holder. The index matching substance is preferably a material that can withstand high temperature and humidity conditions so that the interconnection assembly of this invention is reliable and durable compared to previously known devices, particularly those devices that use epoxy between an optical fiber and an optical waveguide of an OIC.

29 Claims, 14 Drawing Sheets

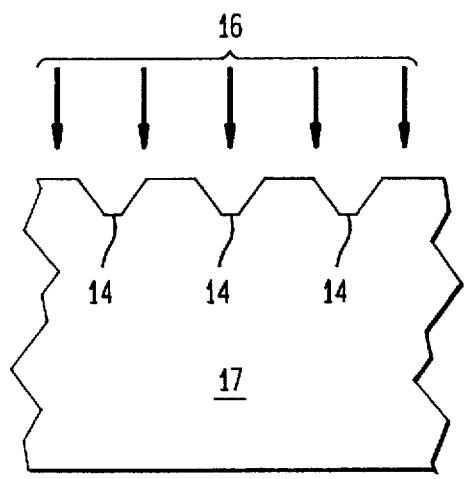
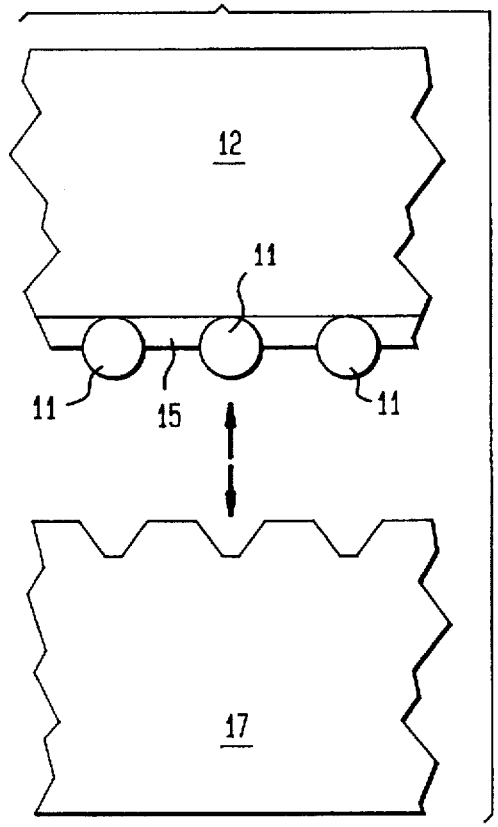
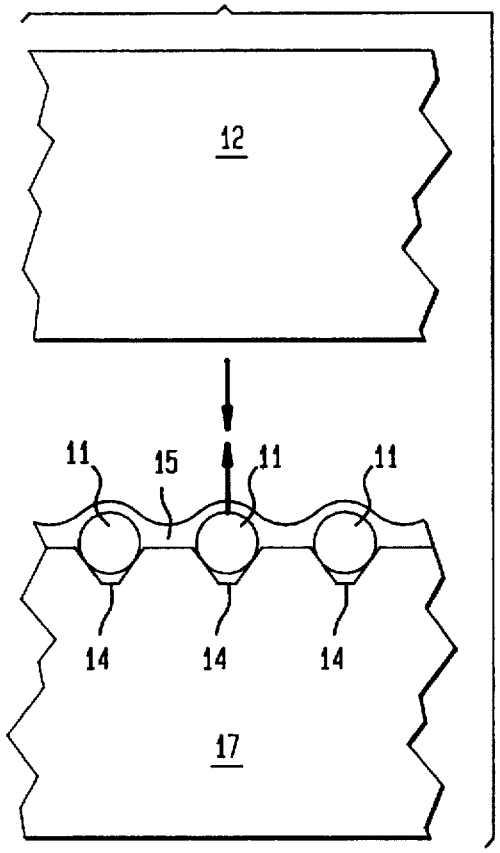
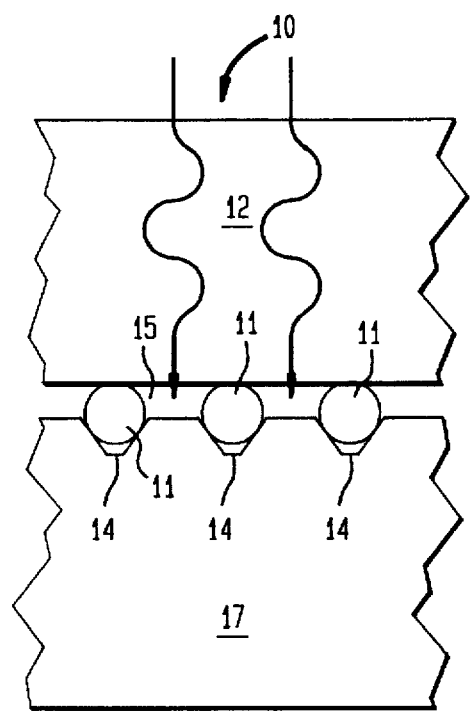

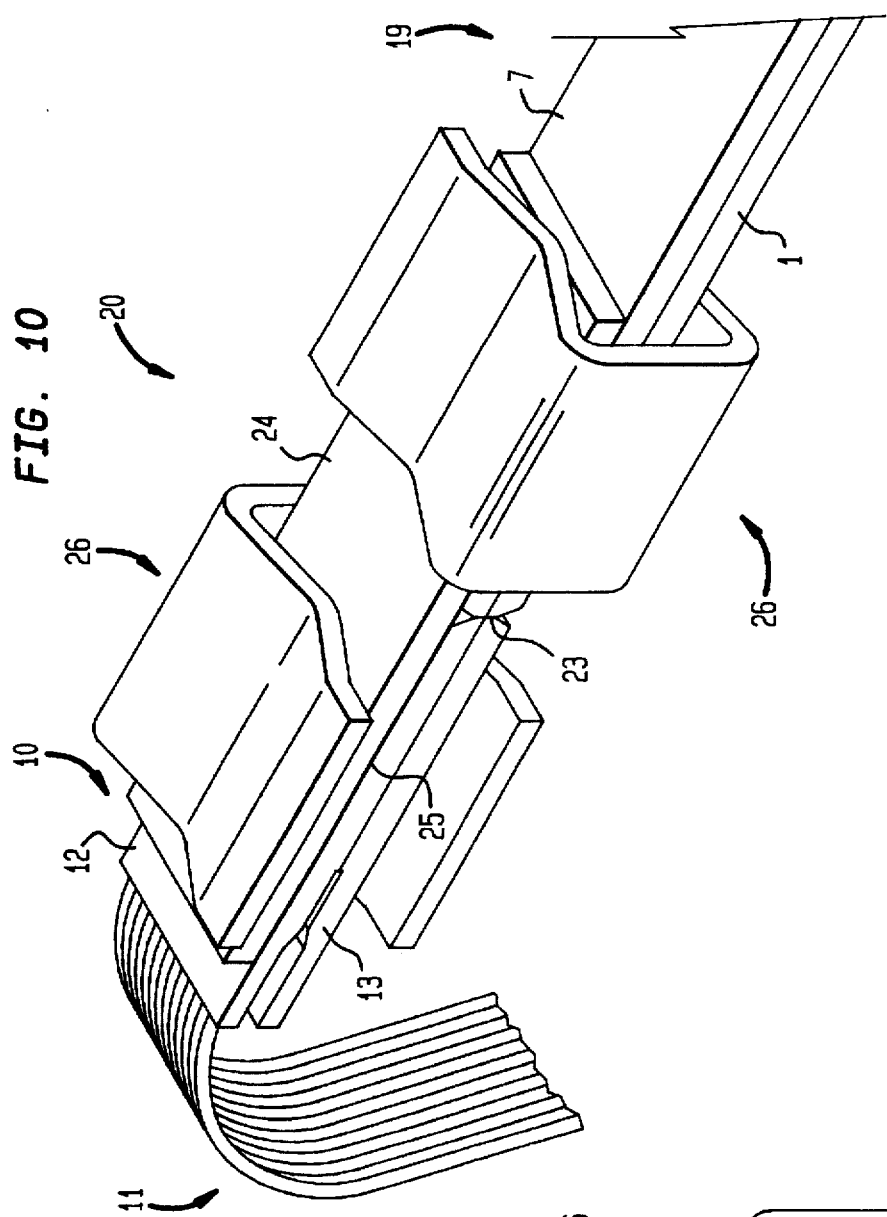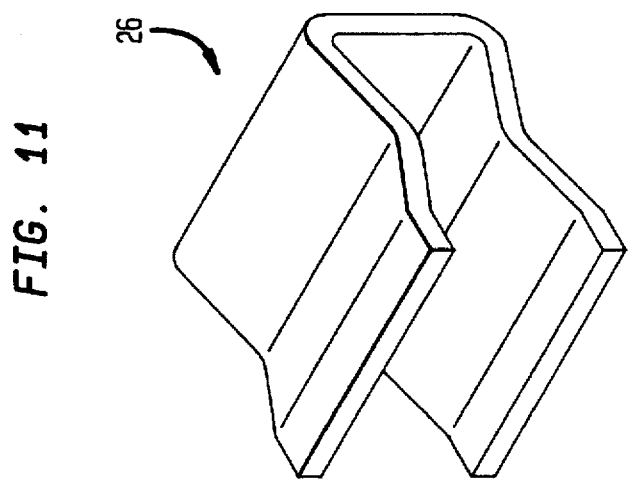

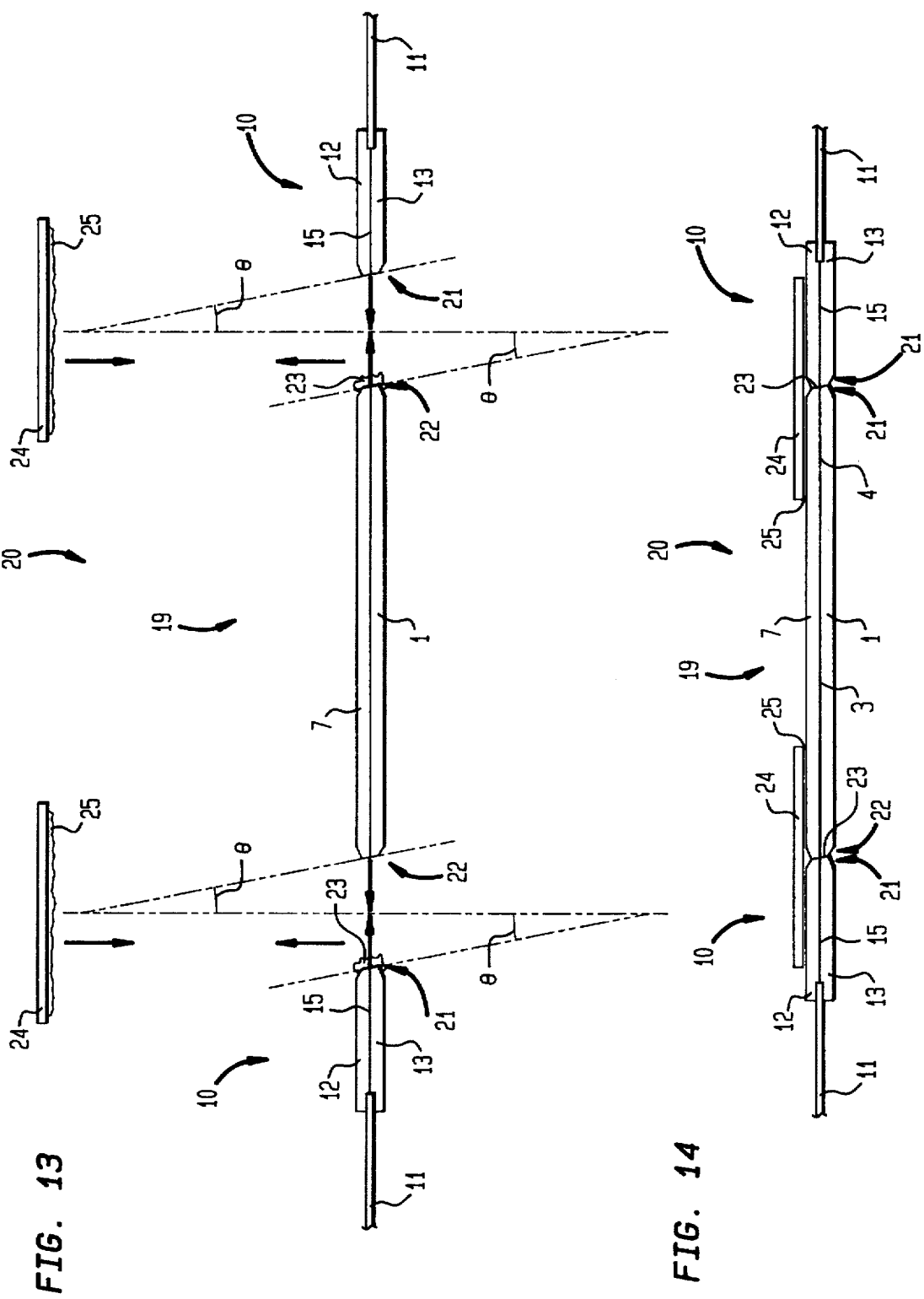

METHOD AND APPARATUS FOR COUPLING OPTICAL FIBERS TO AN OPTICAL INTEGRATED CIRCUIT

CROSS-REFERENCE TO RELATED APPLICATIONS

This invention is related to U.S. Ser. Nos. 08/421,105, 08/421,274 and 08/421,339 filed Apr. 13, 1995 and invented by George F. DeVeau.

BACKGROUND OF THE INVENTION

1. Field of the Invention

This invention is directed to an apparatus and method for coupling optical fibers with respective optical waveguides formed on an optical integrated circuit (OIC).

2. Description of the Related Art

Optical integrated circuits (OICs) are increasingly being used in the telecommunications industry to process signals carried on optical fibers. OICs can include devices such as 1×N splitters, switches, wave division multiplexers, filters, optical amplifiers, lasers or other optical devices integrated on a substrate. The OICs are coupled to optical waveguides integrated on the substrate, that transmit signals to and from the optical devices of the OIC.

To couple the optical fibers to respective optical waveguides formed on an OIC, epoxy is often used to adhere the ends of the optical fibers to the ends of optical waveguides exposed by cutting and polishing the OIC. For mild ambient conditions (i.e., relatively low temperature and/or humidity), such epoxy interface may be suitable for coupling the optical fibers to respective optical waveguides of the OIC. However, under more severe ambient conditions (e.g., relatively high temperature and/or humidity), the epoxy can lose bonding strength and allow an optical fiber to separate from an optical waveguide, thus deteriorating or preventing optical signal transmission through the fiber/waveguide interface. Thus, there is a need in the telecommunications industry for a method and device that can couple an optical fiber to an optical waveguide in a manner that can withstand relatively severe ambient conditions.

Another problem commonly encountered in the coupling of optical fibers to optical waveguides of an OIC is that the bonding surface area between the optical fibers and the optical waveguides is relatively small, even where the optical fibers are mounted to a block or the like that is adhered to the OIC. Because the bonding area between the OIC and the optical fibers is relatively small, the optical fibers can easily separate from respective optical waveguides of the optical fiber/OIC assembly is inadvertently struck or subjected to vibration, for example. Thus, there is a need in the telecommunications industry for a device and method for coupling optical fibers to an OIC in a rugged, durable and reliable manner.

In an effort to solve the above problem, the thicknesses and heights of the OIC and the block on which the optical fibers are mounted can be increased to correspondingly increase the bonding surface areas used to couple the optical fibers with respective waveguides of the OIC. However, enlargement of the opposing surface areas of the block and OIC has its own attendant problems. One such problem is that the dimensions of the OIC and block are necessarily increased. Therefore, the resulting OIC/optical fiber connection is made relatively bulky and thus difficult to use, especially where the connection is to be positioned in an area where the space for such connection is limited. Another problem associated with enlarging the opposing bonding surfaces of the OIC and block is that imperfections in the opposing bond surfaces, even when highly polished, can cause significant difficulties in aligning the optical fibers with respective waveguides. Therefore, there is a need in the telecommunications industry for a method and device that will allow optical fibers to be securely bonded to optical waveguides without rendering alignment of the optical fibers and waveguides exceedingly difficult.

SUMMARY OF THE INVENTION

This invention overcomes the disadvantages noted above. In accordance with this invention, an apparatus is provided for coupling an optical fiber end holder (that can be an optical fiber array) housing an end portion of at least one optical fiber, to an optical integrated circuit unit (that can be an OIC assembly) having at least one integrated optical device and at least one integrated optical waveguide coupled to the optical device. The end surface of the holder exposes the end of the optical fiber and the end of the unit exposes an end of the optical waveguide. The apparatus includes a bridge member situated to extend across an interface between an end surface of the holder and an end surface of the unit. A shim layer having a first side in contact with the bridge member and a second side in contact with the holder and the unit, fixes the position of the holder and unit relative to the bridge member so that the ends of the optical fiber and waveguide are substantially aligned.

Preferably, a refractive index matching substance is situated between and in contact with the end surfaces of the holder and the unit. The index matching substance has a refractive index substantially similar to respective refractive indices of the optical fiber and waveguide. The index matching substance is a curable substance having an uncured, liquid state to allow rough alignment of the ends of the optical fiber and the optical waveguide, and a cured, solid state in which the index matching substance is tacky and adheres to the ends of the OIC unit and the optical fiber end holder. The index matching substance has a relatively low modulus of elasticity in its cured state to allow for free adjustment of the alignment of the optical fiber and optical waveguide ends.

If desired to reinforce the adhesive bond between the shim substance and the bridge member, unit and holder, or if the shim substance is not adhesive, retention springs can be use to clamp and hold together the holder to the bridge member and the unit to the bridge member, to form the interconnection assembly of this invention.

This invention also includes a related method. The method for coupling an end of at least one optical fiber exposed in an end surface of an optical fiber end holder, to an end of an optical waveguide exposed in an end surface of an optical integrated circuit (OIC) unit, includes a step of arranging the respective end surfaces of the holder and the unit in close proximity in an opposing relationship and a step of applying an uncured shim substance to at least one of a surface of a bridge member and respective surfaces of the holder and the unit that are transverse to respective end surfaces of the holder and the unit. The method also includes steps of joining the bridge member to the unit and the holder so that the bridge member overlaps the holder and unit and so that the uncured shim substance forms a shim layer between the bridge member and the surfaces of the holder and unit that are transverse to respective end surfaces of the holder and the unit. The method also includes steps of aligning the end of the optical fiber to the end of the optical waveguide by positioning the holder and the unit relative to one another and a step of curing the shim layer to fix the end of the optical fiber in alignment with the end of the optical waveguide. The shim layer can be, but is not necessarily, an adhesive. The method can include a step of applying a refractive index matching substance with a refractive index substantially similar to refractive indices of the optical waveguide and fiber, to at least one of the end surfaces of the holder and unit before joining the unit and the holder. The method also can also include a step of curing the index matching substance so that the index matching substance becomes tacky and adheres to the end surfaces of the holder and the unit. The index matching substance has a relatively low modulus of elasticity when cured to allow a degree of movement of the unit relative to the holder so that the step of aligning can be performed. The method can also include steps of attaching a retention spring to the bridge member and the holder, or to the bridge member and the unit, to hold the interconnection assembly together or to reinforce the interconnection assembly. To aid in alignment of the ends of the optical fibers to respective waveguides, the method can include a step of beveling at least one of the ends surfaces of the holder and the unit to create a relatively small surface area that has fewer defects than would an unbeveled, larger surface area so that the alignment of the interconnection assembly is comparatively easy to perform relative to previously known methods.

These together with other objects and advantages, which will become subsequently apparent, reside in the details of construction and operation as more fully hereinafter described and claimed, reference being had to the accompanying drawings, forming a part hereof, wherein like numerals refer to like parts throughout the several views.

BRIEF DESCRIPTION OF THE DRAWINGS

The present invention can be better understood with reference to the following drawings. The drawings are not necessarily to scale, emphasis instead being placed upon clearly illustrating the principles of the present invention.

FIGS. 6A–6F are cross-sectional views of a second preferred method for making an optical fiber array in accordance with a related invention;

FIG. 10 is a perspective view of an assembled interconnection assembly;

FIG. 11 is a perspective view of a retention spring in accordance with this invention;

FIG. 13 is an exploded side view of the interconnection assembly for showing a method for making the interconnection assembly;

FIG. 14 is a side view of an assembled interconnection assembly;

DESCRIPTION OF THE PREFERRED EMBODIMENTS

Figure 1:
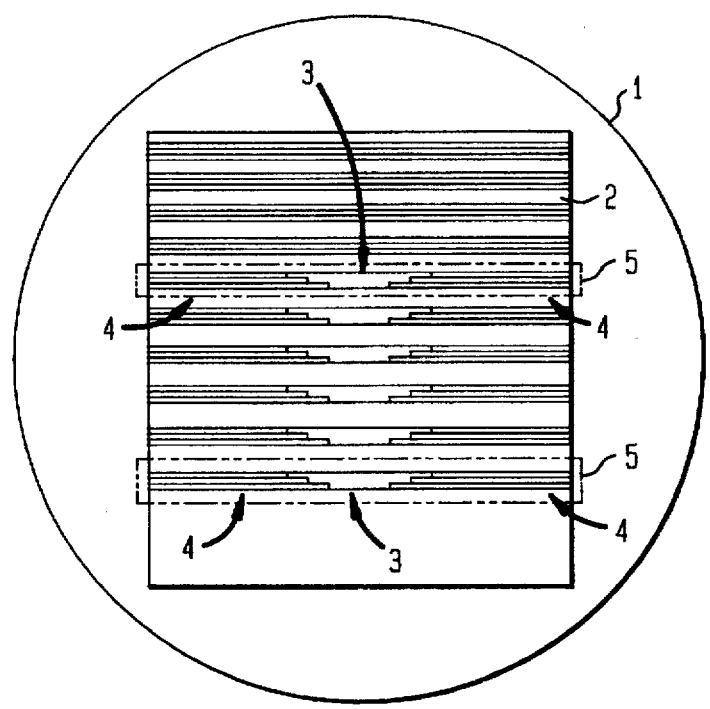
FIG. 1 is a top plan view of a substrate with optical integrated circuits (OICs)

In FIG. 1, a substrate 1, preferably made from silicon, has an optical integrated circuits (OICs) integration area 2 in which are formed a plurality of OICs 3 (only a few of which are specifically indicated in FIG. 1). The OICs 3 have optical waveguides 4 (only a few of which are specifically indicated in FIG. 1) which serve to transmit optical signals to and from respective OICs 3. The OICs 3 and their respective optical waveguides 4 can be separated from the remaining of the silica substrate 1 by dicing along dice lines 5.

Figure 2:
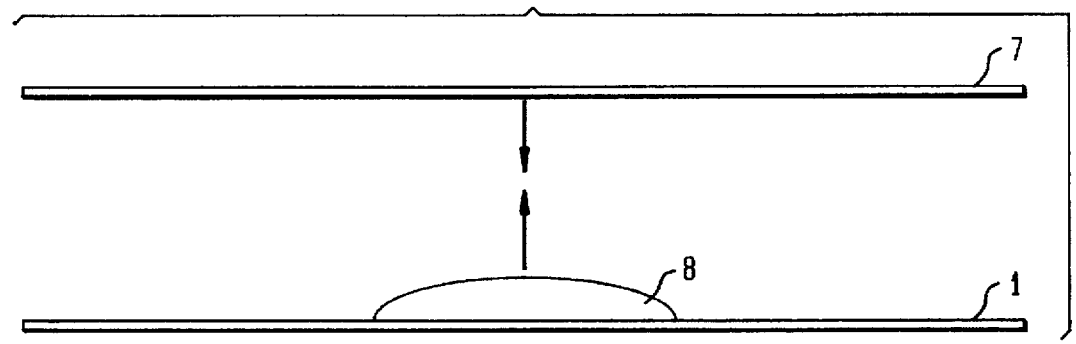
FIG. 2 is a side view of a procedure for adhering a protective plate to the substrate.

Preferably, before dicing, a protective plate 7 is adhered to the substrate 1 on the side of the substrate 1 on which the OICs 3 and their respective waveguides 4 are formed as shown in FIG. 2. Preferably, the protective plate 7 is made of a relatively hard substance to protect the OICs and their respective optical waveguides 4. For example, the protective plate 7 can be a borosilicate glass (i. e., pyrex™) or silicon or other suitable material. Importantly, the protective plate 7 should have a thermal coefficient of expansion substantially similar to the substrate 1. In other words, the difference in thermal coefficients of expansion between the materials composing the substrate 1 and the protective plate 7 should be less than $2\times10^{-6}$ cm/cm/°C. and preferably much closer. For example, borosilicate glass has a thermal coefficient of expansion $3.25\times10^{-6}$ cm/cm/°C. whereas silicon has a thermal coefficient of expansion of $3.24\times10^{-6}$ cm/cm/°C. for a difference in thermal coefficient values of about $10\times10^{-9}$ cm/cm/°C. In contrast, the prior art optical fiber array previously described in this document uses silica-glass frames with thermal coefficients of expansion of $0.55\times10^{-6}$ cm/cm/°C. for silica and about $3.25\times10^{-6}$ cm/cm/°C. for glass for a difference in thermal coefficient of expansion values of about $2.7\times10^{-6}$ cm/cm/°C., a relatively large difference in thermal coefficient of expansion values which can destroy adhesive bonds used to form the optical fiber array when the optical fiber array of the prior art device is subjected to temperatures and/or humidity conditions different from those in which the prior art device was fabricated. This invention reduces or eliminates the destruction of adhesive bonds by selecting materials with substantially similar thermal coefficients of expansion to form the substrate 1 and the protective plate 7.

Figure 3:
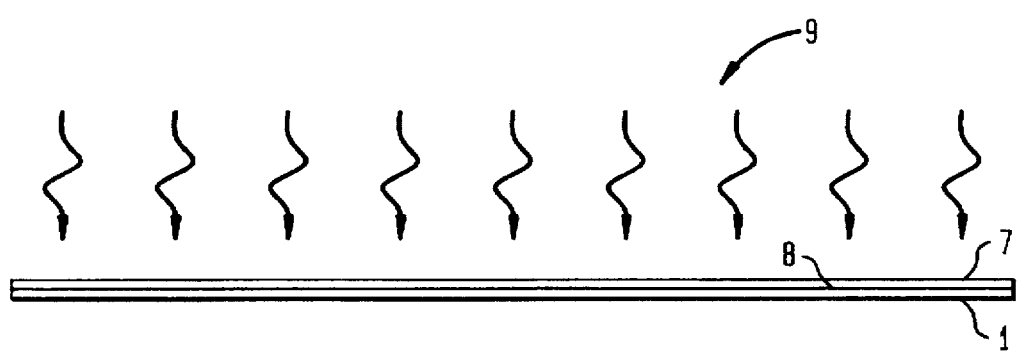
FIG. 3 is a side view of a procedure for curing an ultraviolet-curable adhesive to hold the protective plate and substrate together.

As shown in FIG. 2, an adhesive 8 is applied to an opposing surface of either the protective plate 7 of the substrate 1, and the protective plate 7 is joined together with the substrate 1 using the adhesive layer 8 which forms a relatively thin layer when squeezed between the substrate 1 and the protective plate 7 as shown in FIG. 3. Preferably, the adhesive 8 is an ultraviolet (UV)-curable adhesive in which case the protective plate 7 should be made of a material which is transparent to UV light, such as borosilicate glass. In FIG. 3, UV light 9 is generated from a UV light source and passes through the protective plate 7 to irradiate the adhesive 8. The adhesive 8 is thus cured and holds the protective plate 7 and the substrate 1 together. Alternatively, the adhesive 8 can be a thermally-or room-temperature-curable adhesive in which case the protective plate 7 can be made of a material which is not transparent to UV light. The substrate 1 and the protective plate 7 are then diced to separate the OICs 3 into separate OIC assemblies.

Figure 4:
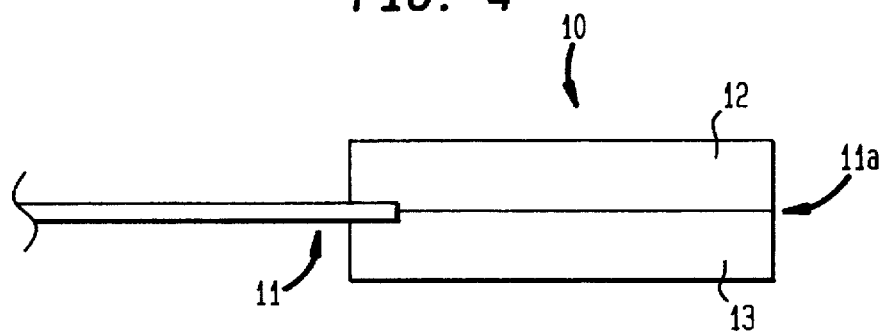
FIG. 4 is a side view of an optical fiber array.

To couple the ends of the optical waveguides 4 of an OIC assembly to respective ends of a plurality of optical fibers, the ends of the optical fibers are housed in an optical fiber array 10, as shown in FIG. 4. The optical fiber array 10 receives end portions of a plurality of optical fibers 11. The end portions of the optical fibers 11 are stripped of their protective covers using an acid or mechanical stripping, for example. The end portions of the optical fibers 11 are sandwiched between a fast part 12 and a second part 13 preferably held together with an adhesive. Preferably, the opposing surfaces of the first and second parts 12, 13 are stepped at one end of the optical fiber array 10 by grinding or polishing, for example, to receive a portion of the optical fibers 11 with unstripped protective coverings to prevent breakage against the edges of the first and second parts 12, 13 that could otherwise occur if stripped optical fibers 11 against the edges of the first and second parts 12, 13 were coupled to this end of the optical fiber array 10. The ends 11a of the optical fibers 11 are exposed at the other end of the optical fiber array 10 as shown in FIG. 4. Importantly, the fast and second parts 12, 13 should be formed from respective materials with substantially similar thermal coefficients of expansion either with the same material or different materials such as silicon and borosilicate glass, which have substantially similar coefficients of expansion, as previously explained with respect to the substrate 1 and the protective plate 7. The use of borosilicate glass for one of the first and second parts 12, 13 allows for UV-curable adhesives to be used because borosilicate glass is transparent to UV light. Because UV curable adhesives are relatively easy to use because they do not cure until UV light is irradiated on them, the first and second parts 12, 13 can be positioned relative to each other without UV-curable adhesive setting before proper positioning of the first and second parts 12, 13 is accomplished. Also, alignment grooves can readily be formed in silicon to aid in proper positioning of the optical fibers using photolithography and/or etching or selective deposition techniques. Therefore, the use of borosilicate glass to form one of the first and second parts 12, 13 and the use of silicon to form the other of the first and second parts 12, 13 provides significant advantages relative to prior art optical fiber arrays. In accordance with a related invention, four methods for making an optical fiber array 10 are described below.

Figure 5A:
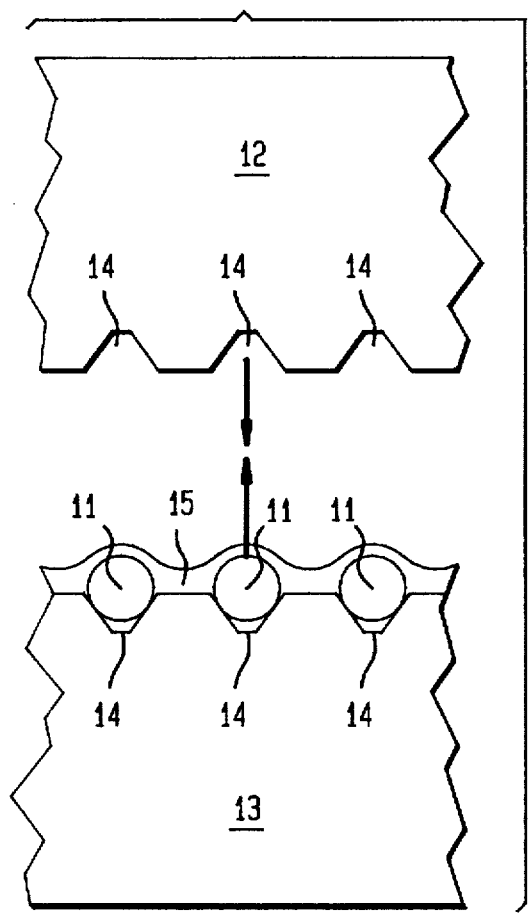
FIGS. 5A–5B are cross-sectional views of a first preferred method for making an optical fiber array in accordance with a related invention.
Figure 5B:
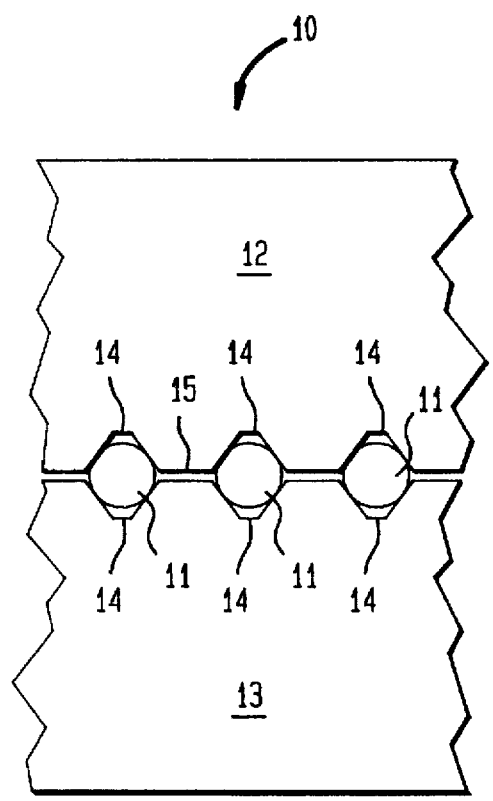

FIGS. 5A and 5B are cross-sectional diagrams of a method for forming an optical fiber array 10. In FIG. 5A, the fast and second parts 12, 13 are selected and formed from materials such as silicon, ceramic or boresilicate glass (i.e., pyrex™) which have the same or substantially similar thermal coefficients of expansion. The first and second parts 12, 13 have corresponding spaced, parallel alignment grooves 14, preferably spaced at 250 micron intervals to conform to industry standard optical fiber spacings, which can be readily formed using photolithography and/or etching or selective deposition techniques if the first and second parts 12, 13 are made of silicon. However, the first and second parts 12, 13 can be formed of other materials such as borosilicate glass in which the alignment grooves 14 can be formed by selective deposition of borosilicate glass or by mechanical etching using a diamond scribe, for example. The ends 11a of the optical fibers 11 are exposed at one end of the topical fiber array 10, as shown in FIG. 4. Importantly, the first and second parts 12, 13 should be selected and formed from materials with substantially similar thermal coefficients of expansion either with the same materials or different materials such as silicon and borosilicate glass which have substantially similar thermal coefficients of expansion as previously explained with respect to the substrate 1 and the protective plate 7. The first and second parts 12, 13 serve to hold the end portions of the optical fibers 11 in a laterally spaced, parallel relationship. The first and second parts 12, 13 also serve to protect the end portions of the optical fibers 11 and also are preferably sufficiently large to allow the optical fiber array 10 to be gripped either between fingers or in a micropositioner used to align the optical fiber ends 11a with respective ends of the optical waveguides 4 of an OIC 3 housed in an OIC assembly. The optical fiber array 10, and accordingly the first and second parts 12, 13 should be sufficiently large in length and width to allow for a relatively strong adhesive bond to be formed to hold the first and second parts 12, 13 together. The optical fiber array 10, and hence the fast and second parts 12, 13 should also be sufficiently wide to house the end portions of the optical fibers 11 spaced at intervals, for example, of 250 microns. The optical fiber array 10 should also be sufficiently large in height so that the optical fiber array 10 is not easily broken. For example, the optical fiber array 10 can have a length of about one centimeter, a width of about four millimeters to house twelve optical fibers 11, and a height of from two to four centimeters. In other words, the first and second parts 12, 13 should each be formed to be about one centimeter in length, about four millimeters wide and from one to two millimeters in height. The first and second parts 12, 13 can be formed by grinding, polishing or cutting respective material pieces, or by molding the first and second pieces to conform to these dimensions. Of course, other dimensions for the optical fiber array 10 and/or numbers of optical fibers 11 can be used without departing from the scope of this invention. Preferably, the alignment grooves 14 have angled sides which tend to center the end potions of the optical fibers 11 in the alignment grooves 14. A layer of adhesive 15 is applied to a surface of one of the first and second parts 12, 13 and the end potions of the optical fibers 11 are positioned in respective alignment grooves 14 of one of the first and second parts 12, 13. When the first and second parts 12, 13 are joined together, the end portions of the optical fibers 11 are held between corresponding alignment grooves 14 of the first and second parts 12, 13, and the adhesive 15 contacts the fast and second parts 12, 13 and the optical fibers 11. The adhesive 15 is then cured to form the optical fiber array 10 as shown in FIG. 5B. If at least one of the fast and second parts 12, 13 is transparent to UV light, the adhesive 15 can be a UV curable adhesive cured by application of UV light. Alternatively, the adhesive 15 can be a thermally-cured or a room-temperature-cured variety of adhesive in which case the adhesive 15 is cured by the application of heat with an appropriate temperature.

Figure 6E:
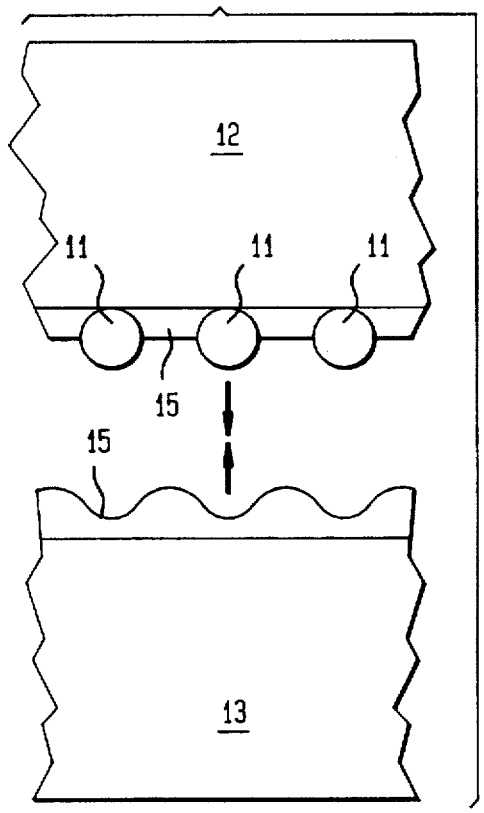
Figure 6F:
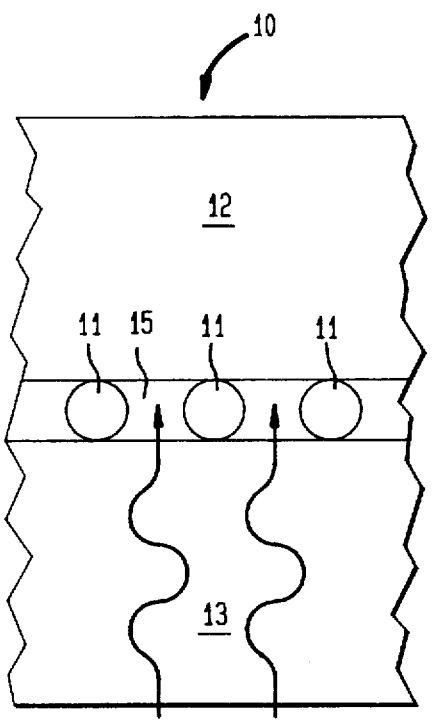

FIGS. 6A–6F are diagrams of a second preferred method of this invention for making an optical fiber array 10. In FIG. 6A, a mold release substance 16 such as Teflon™ is applied to an alignment member 17 for aligning the end potions of the optical fibers 11. The alignment member 17 can be made from ceramic, silicon, glass or other material and has highly precise alignment grooves 14 formed by etching or mechanical cutting of the alignment member 17. An alignment member 17 of a ceramic variety is commercially available from MGK-Locke of Nagoya, Japan. Preferably, the alignment grooves 14 are formed at 250 micron intervals and thus conform to industry-stand spacings of the optical fibers 11. In FIG. 6B, end potions of the optical fibers 11 are positioned in respective alignment grooves 14 and ad adhesive layer 15 is applied to the surface of the alignment member 17 and the end portions of the optical fibers 11 as shown in FIG. 6B, or is applied to the opposing surface of the first part 12. The first part 12, preferably formed of a material transparent to UV light such as borosilicate glass, is brought together with the alignment member 17 so that the adhesive 15 is squeezed out to form a relatively thin layer between the alignment member 17 and the first part 12. In FIG. 6C, UV light is generated from a source and passes through the first part 12 to irradiate the adhesive 15. Alternatively, if the alignment member 17 is formed from a material transparent to UV light, the first part 12 need not be made of a material transparent to UV light because the UV light can be irradiated on the adhesive 15 through the alignment member 17 in this case. The irradiation of the adhesive 15 causes the adhesive 15 to cure and hold the end portions of the optical fiber 11 in the spaced, parallel relationship defined by the alignment grooves 14. The end portions of the optical fibers 11 are thus adhered to the first part 12. Alternatively, the adhesive 15 can be of a thermally-cured or room-temperature-cured variety cured by the application of heat with an appropriate temperature in which case the first part 12 and the alignment member 17 can be made of materials that are not transparent to UV light. In FIG. 6D, the first part 12 with attached end portions of the optical fibers 11 is pulled away from the alignment member 17. Due to the application of the mold release substance 16, the adhesive layer 15 and the end portions of the optical fibers 11 do not adhere to the alignment member 17 and thus are readily pulled away and separated from the alignment member 17. In FIG. 6E, the first part 12 is positioned to oppose a surface of the second part 13 to which an uncured adhesive layer is applied. Importantly, the first and second parts 12, 13 are selected to be materials with the same or substantially similar thermal coefficients of expansion for reasons previously explained. The first and second parts 12, 13 can be formed with appropriate dimensions by grinding, polishing or cutting respective larger pieces of materials, or by molding the first and second parts 12, 13 with appropriate dimensions from respective materials. The first and second parts 12, 13 are brought together so that the adhesive 15 and the end portions of the optical fibers 11 attached to the first part 12, make contact with the adhesive 15 applied to the second part 13. Preferably, the second part 13 is made of a substance transparent to UV light. In FIG. 6F, the uncured adhesive 15 is irradiated with UV light generated from a UV light source, to cure the adhesive 15. Alternatively, the second part 13 can be formed of a material opaque to UV light, in which case the UV light can be shined through the first part 12 to cure the adhesive 15. The resulting configuration of the optical fiber array 10 is shown in FIG. 6F.

Figure 7B:
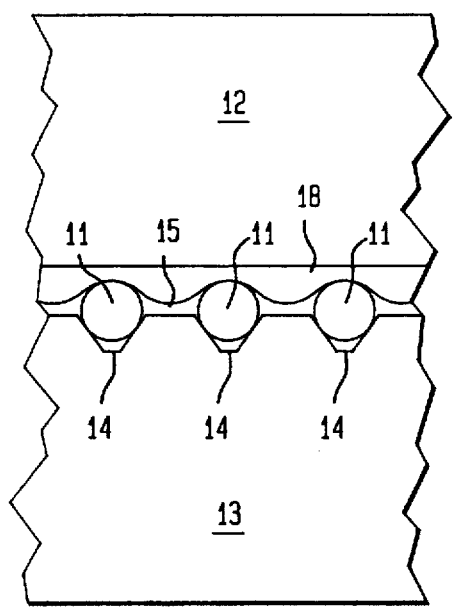
FIGS. 7A–7C are cross-sectional views of a third preferred method for making an optical fiber array in accordance with a related invention.
Figure 7A:
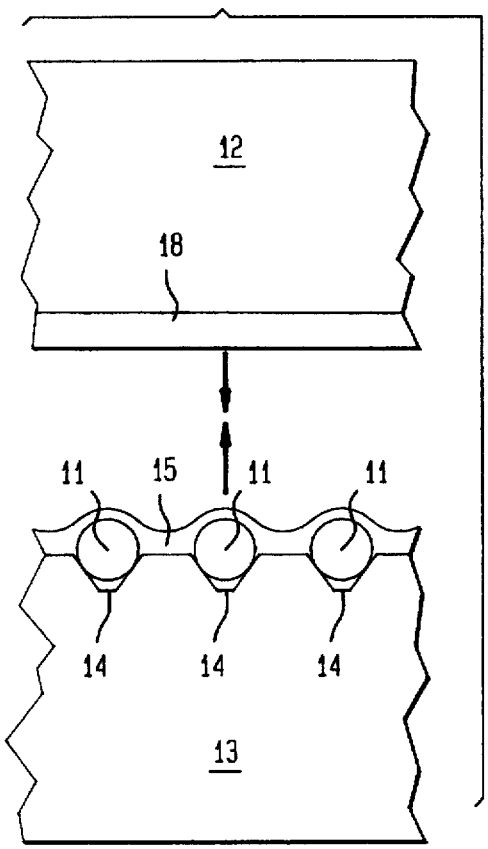
Figure 7C:
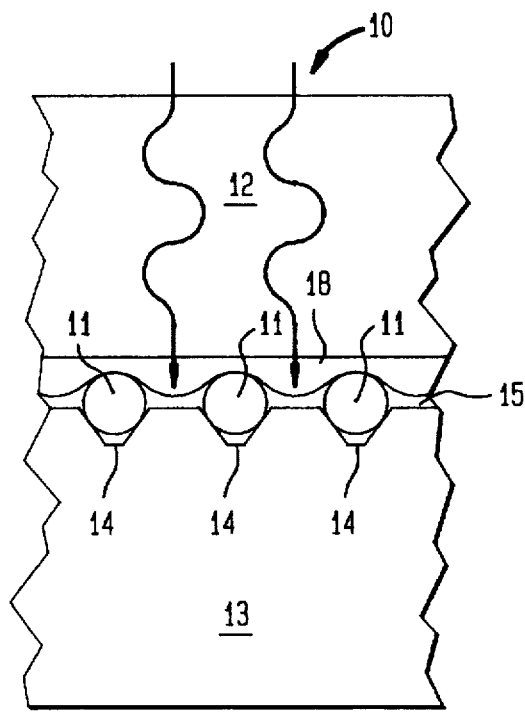

FIGS. 7A through 7C are diagrams of a method for making an optical fiber army 10 in accordance with a third preferred method of a related invention. In FIG. 7A, end portions of the optical fibers 11 are positioned in respective alignment grooves 14 formed on the second part 13. Adhesive 15 is then applied to end portions of the optical fibers 11 and exposed surfaces of the second part 13, or on a compliant layer 18 formed on the first part 12. The first part 12 with the compliant layer 18 is then joined with the second part 13 so that the compliant layer 18 contacts the adhesive 15 and the end portions of the optical fibers 11. The complaint layer 18 can be a relatively thin layer of polymer material such as polyester tape, an ethyl acetate coating or thin-film plasma deposition provided by Polar Materials, Inc. of Martins Creek, Pa. The compliant layer 18 is pliant and thus conforms to the outer surfaces of the end portions of the optical fibers 11. Because the optical fibers 11 often have differing dimensions, the compliant layer 18 conforms to the shape of the end portions of the optical fibers 11, as shown in FIG. 7B, when the first and second parts 12, 13 are brought together. The adhesive 15 thus contacts the complaint layer 18, the end portions of the optical fibers 11 and the second part 13. If the adhesive 15 is a UV curable type, UV light is irradiated from a source to cure the adhesive 15, as shown in FIG. 7C. Preferably, the fast part 12 and the compliant layer 18 are transparent to UV light because the alignment grooves are more readily formed by etching, for example, of the second part 13 is made of a materials such as silicon which is relatively opaque to UV light. Importantly, the first and second parts 12, 13 are selected and formed from respective materials that have substantially similar thermal coefficients of expansion which reduce stresses and strains upon the adhesive layer 15 when the optical fiber army 10 is subjected to temperatures different from those existing at the time the optical fiber array 10 is manufactured. Therefore, by selecting materials with similar coefficients of expansion to form the first and second parts 12, 13, the bonding strength of the adhesive layer 15 remains relatively strong even if the optical fiber array 10 is subjected to temperatures which vary greatly from those existing when the optical fiber array 10 is manufactured.

Figure 8A:
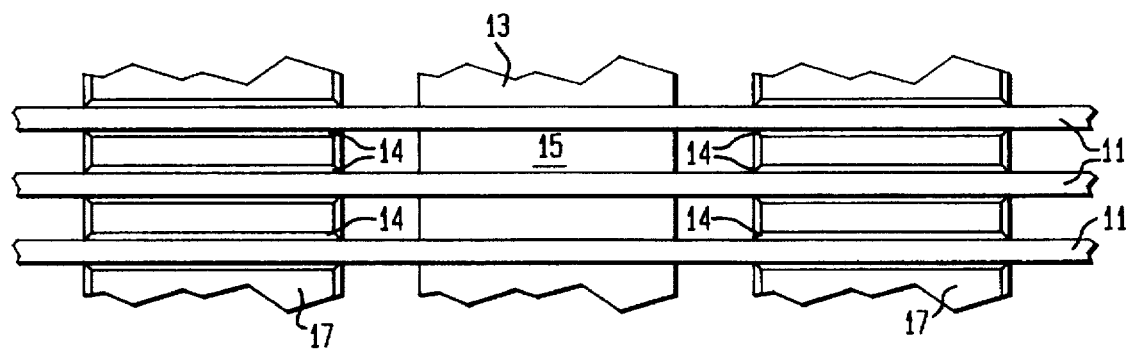
FIGS. 8A–8E are cross-sectional views of a fourth preferred method for making an optical fiber array in accordance with a related invention.
Figure 8B:
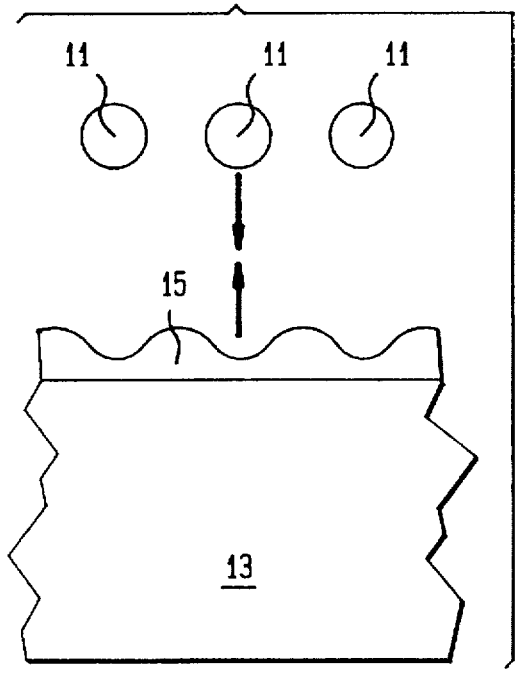

FIGS. 8A–8E are diagrams showing a fourth preferred method for making the optical fiber array 10 in accordance with a related invention. In FIG. 8A, the end portions of optical fibers 11 are positioned in respective spaced, parallel alignment grooves 14 of two spaced alignment members 17. Preferably, the alignment grooves 14 are linear and spaced at 250 micron intervals to conform to industry standard optical fiber spacings. The two alignment members 17 are included in a commercially available part included in the Fujikura FSM20 are fusion splicer made by Alcoa Fujikura Ltd. of Duncan, S.C., a machine which is used in arc-fusion splicing of optical fibers, a technology which is not relevant to this invention. The splicing of optical fibers, a technology which is not relevant to this invention. The alignment members 17 used in the Fujikura FSM20 are fusion splicer are manufactured by NGK-Locke of Nagoya, Japan. A second part 13 with an adhesive 15 applied to its surface, is positioned between the alignment members 17 at an elevation below the end portions of the optical fibers 11. The second part 13 is brought upwardly in a direction out of the plane of the sheet of FIG. 8A so that the adhesive 15 is applied to the surface of the second part 13, contacts the end portions of the optical fibers 11. FIG. 8B is a cross-sectional diagram showing the action of bringing the adhesive 15 on the second part 13, into contact with the end portions of the aligned optical fibers 11.

Figure 8C:
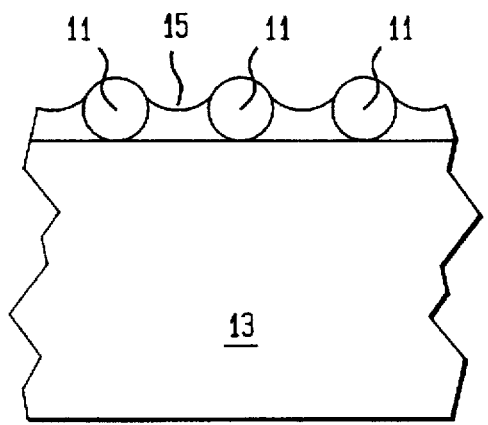

In FIG. 8C, the adhesive 15 is cured so that the optical fibers 11 are held in a spaced, parallel relationship on the surface of the second part 13. If the adhesive 15 is UV-curable adhesive, UV light from a UV light source is irradiated on the adhesive 15. Alternatively, if the adhesive 15 is a room-temperature- or thermally-curable substance, the adhesive 15 is subjected to an appropriate temperature to set the adhesive 15.

Figure 8D:
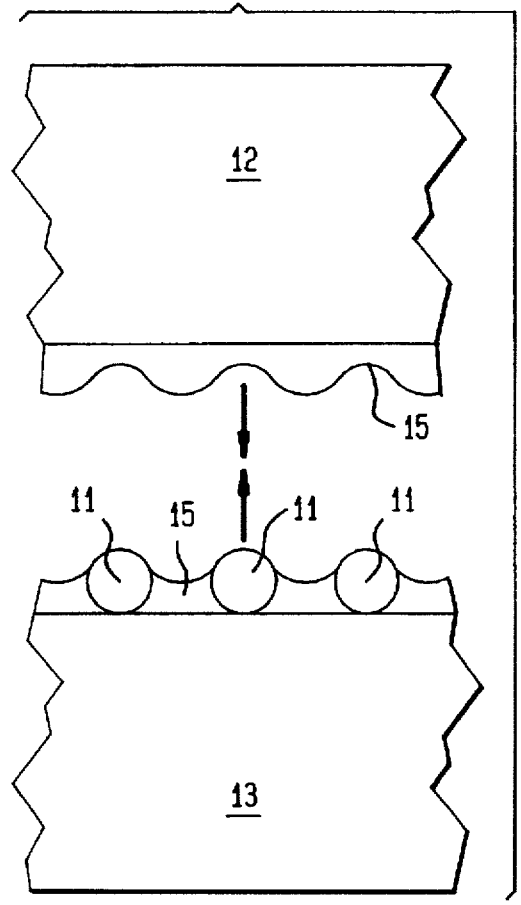

In FIG. 8D, adhesive 15 is applied to a surface of at least one of the fast and second parts 12, 13 and the first part 12 is joined together with the second part 13. Significantly, the first and second parts 12, 13 are selected and formed from respective materials that have substantially similar thermal coefficients of expansion either with the same or different materials (such as herosilicate glass and silicon), for reasons previously explained in this document. The uncured portion of the adhesive layer 15 is then cured by the application of UV light or a temperature appropriate to set the adhesive 15, depending upon the type of adhesive 15 used. If a UV curable adhesive 15 is used, at least one of the first and second parts 12, 13 should be of a substance which is transparent to UV light, such as boresilicate glass (i.e., pyrex™).

Figure 8E:
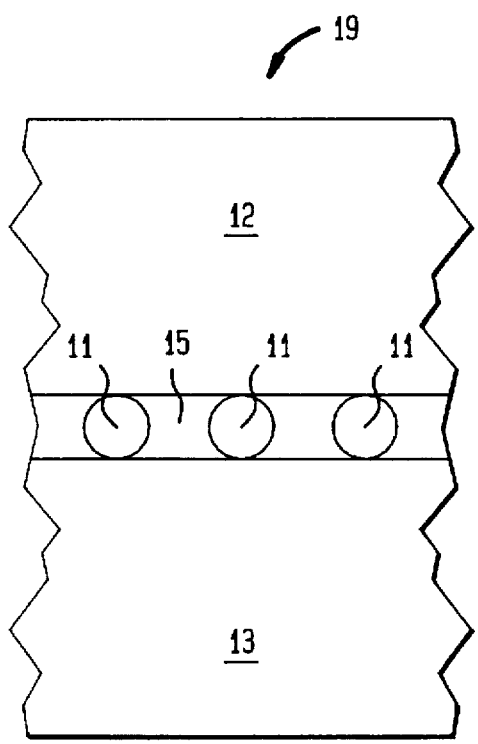

After the adhesive 15 has been cured, the resulting optical fiber array 10 is as shown in FIG. 8E. If desired, the ends of the optical fibers 11 extending from the optical fiber array 10 can be cut away from the optical fiber array 10 in preparation for polishing the end of the optical array to form fiber ends 11a substantially flush with the end face of the optical fiber array 10. Alternatively, the loose ends of the optical fibers 11 can be removed by polishing the end face of the optical fiber array 10.

Figure 9:
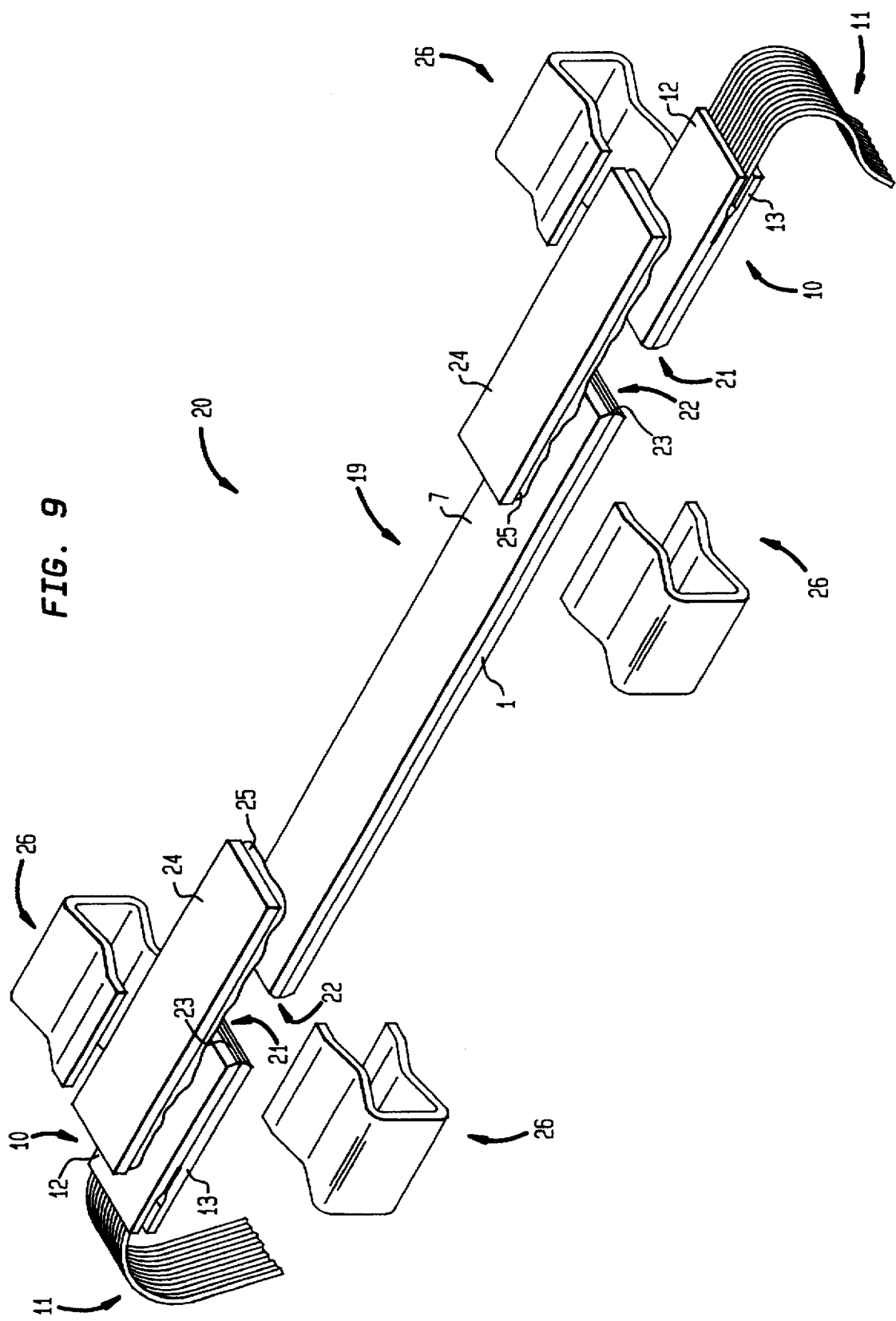
FIG. 9 is an exploded perspective view of the interconnection assembly of this invention.

FIG. 9 is an exploded perspective view of an interconnection assembly 20 for optically coupling the optical waveguides 4 of an OIC assembly 19 with the optical fibers 11 of two optical fiber arrays 10. Depending upon the type of OIC housed in the OIC assembly 19, it may be desirable to couple only one optical fiber array 10 to an OIC assembly 19, but the interconnection assembly of FIG. 9 shows the more common configuration in which an OIC assembly 19 is coupled to two optical fiber arrays 10 arranged on opposite ends of the OIC assembly. The assembly and use of an interconnection assembly 21 with only one optical fiber array 10 coupled to an end of an OIC assembly will be clear from the description of the embodiment of the interconnection assembly of FIG. 9.

To prepare end surfaces 21, 22 of the optical fiber arrays and the OIC assembly, respectively, to be joined together, the end surfaces are polished or ground at an angle, preferably in a range from 6 to 12 degrees, relative to a plane normal to the direction of travel of light between the optical fibers and respective optical waveguides. The angled surfaces reduce reflection of light from the respective end surfaces of the optical fiber array 10 and the OIC assembly 19. In proximity to the end surfaces 21, the upper side edges of the first parts 12 and the lower side edges of the second parts 13 of the optical fiber arrays 10 are beveled by polishing or grinding, for example, for reasons that will be described later in this document. Likewise, at the end surfaces 22 of the OIC assembly 19, the upper side edges of the protective plate 7 and the lower side edges of the substrate 1, are beveled by polishing or grinding.

A refractive index matching substance 23 is applied to one or both of the end surfaces 21, 22 for the optical fiber/waveguide interface at each end of the OIC assembly 19 and the two optical fiber arrays 10. The index matching substance 23 is applied in sufficient quantity that the substance contacts and forms a continuous interface between the ends of the optical fibers 11 and their respective optical waveguides 4 when the end surfaces 21 are joined to respective end surfaces 22. Preferably, the substance 23 has a refractive index that is closely matched to the respective refractive indices of the optical fibers 11 and the optical waveguides 4 to minimize reflection of light travelling through the optical fiber/refractive index matching substance/optical waveguide interfaces formed between the end surfaces 22 and the respective end surfaces 21 of the two optical fiber arrays 10. Preferably, the refractive index matching substance 23 has a relatively low modulus of elasticity so that the end surfaces 21 can be moved relative to respective end surfaces 22 after the substance 23 is cured to allow for fine adjustment of the alignment of the optical fibers 11 with respective optical waveguides 4. Also, the substance 23 is preferably liquid and relatively untacky when uncured, but tacky and polymerized when cured so that the substance 23 adheres to the end surfaces 21, 22 and does not tend to flow out from between the end surfaces 21, 22 under force of gravity. Preferably, the substance 23 is a mixture of General Electric® 6166 A and B that is thermally cured, for example, at 100 degrees Celsius for two minutes.

In accordance with this invention, to hold the alignment of the optical fibers 11 with respective optical waveguides 4, bridge members 24 are used in conjunction with respective shim substances 25. The bridge members 24 are preferably elongated plates that have the same or substantially similar thermal coefficients of expansion as the first and second parts 12, 13 of the optical fiber arrays 10 and the substrate 1 and the plate 7 of the OIC assembly 19. For example, the bridge members 24 can be made of borosilicate glass or silicon. For convenience in assembling the interconnection assembly 21, the bridge members 24 preferably have the same width as the optical fiber array 10 and the OIC assembly 19. Also, the bridge members 24 should have a height sufficient to provide the desired strength for the interconnection assembly 21. For example, the bridge members 24 can have a height of from two to four millimeters to provide sufficient strength for the interconnection assembly 21 for most purposes, although the height of the bridge members 24 can be made greater or less if desirable for a particular application. In length, the bridge members 24 should be sufficiently long to prevent the optical fiber array 10 and the OIC assembly 19 from teetering with respect to one another when the bridge members 24 are engaged with respective surfaces of the OIC assembly 19 and the optical fiber arrays 10. For example, for most purposes, the bridge members 24 should be about three or more centimeters in length. When made with this length, the resulting overlap of about one and one-half centimeters or more on the surfaces of the OIC assembly 19 and the respective optical fiber arrays 10 when the bridge members 24 are positioned to overlap and engaged with respective surfaces of the OIC assembly 19 and the optical fiber arrays 10, is sufficient to maintain the alignment between the optical fibers 11 and the optical waveguides 4.

The shim substance 25 in its uncured, liquid state, is applied to either or both of the opposing surfaces of the bridge member 24 and portions of the surfaces of the optical fiber array 10 and the OIC assembly 19 that are transverse to their respective end surfaces 21, 22. In FIG. 9, these surfaces are the upper major surfaces of the first part 12 and the protective plate 7 that are adjacent to respective end surfaces 21, 22. It should be understood that the bridge members 24 with respective shim substances 25 could as well be applied to portions of the second part 13 and the substrate 1 that are adjacent to respective end surfaces 21, 22. The bridge members 24 are arranged to overlap the portions of the surfaces of the optical fiber array 10 and the OIC assembly 19 that are transverse to respective end surfaces 21, 22, and joined together with these surfaces so that the bridge members 24 extend across the interfaces between respective opposing end surfaces 21, 22. When so joined, the shim substance 25 forms a layer between the surface of the bridge members 24 and the opposing surfaces of the optical fiber array 10 and the OIC assembly 19. Fine adjustment of the alignment of the optical waveguides 4 to respective optical fibers 11 is then performed and the shim substance 25 is caused to cure and assume its solid state. When so cured, the substance 25 becomes a shim layer that fixes the position of the optical fiber arrays 10 and respective ends of the OIC assembly 19 relative to the bridge member 24, and thus also fixes the alignment of the ends of the optical fibers 11 to respective ends of the optical waveguides 4.

The shim substance 25 has relatively low shrinkage, preferably less than 0.1% by volume, between its uncured, liquid state and its cured, solid state. The low shrinkage criterion is important for the shim substance 25 because the shim substance serves to fix the position of the optical fiber array 10 relative to a bridge member 24, and also serves to fix the position of the OIC assembly 19 relative to a bridge member 24, so that the optical fibers 11 are fixed in alignment with the optical waveguides 4. If a substance with a shrinkage that is too high is used, the substance could shift the optical fibers 11 out of alignment with respective optical waveguides 4. Some examples of suitable materials for the shim substance 25 include Murray Hill MH 77A™ filled with silica or silicon to 82%, for example, by volume that is commercially available from AT&T® Corporation, and a substance known as Master Bond™ EP 65HT-1™. Both the Murray Hill MH 77A™ and EP 65HT-1™ substances are heat-curable. The Murray Hill MH 77A™ and EP 65HT-1™ substances are adhesive and so hold the bridge members 24 to respective surfaces of the optical fiber arrays 10 and the OIC assembly 19. However, the shim substance 25 does not have to be an adhesive substance because retention springs 26 can be used to hold the bridge members 24 together with the optical fiber arrays 10 and the OIC assembly 19.

If the shim substance 25 is an adhesive, the resulting bond between the bridge member 24 and the optical fiber arrays 10 and the OIC assembly 19 may be sufficiently strong for many applications. However, if the shim substance 25 is not an adhesive substance, or if strength reinforcement of an adhesive shim substance 25 is desirable, the retention springs 26 can be used. Similar springs have been disclosed in U.S. Pat. No. 4,662,713. The retention springs 26 are made of a resilient material such as beryllium copper or copper-nickel-tin. When viewed from the sides, the retention springs 26 are approximately U-shaped having an end potion defining the base of the "U" that supports in cantilever fashion two members with opposing surfaces. The open end of the retention springs 26 are forced into respective side surfaces of the interconnection assembly where the of the bridge member 24 overlaps the optical fiber array 10 or OIC assembly 19. Near their middle portions, the two opposing surfaces of the retention springs 26 define edges that are relatively close together, that engage with the bridge member 24 and respective surfaces of the optical fiber arrays 10 and the OIC assembly 19, when the retention springs are forced into the sides of respective bridge members 24 and optical fiber arrays 10 or the OIC assembly 19. These opposing edges of the retention springs 26 are forced apart when the springs 26 are forced onto respective sides of the bridge members 24 and the optical fiber arrays 10 or the OIC assembly 19 so that the springs 26 grip and hold together overlapping portions of the bridge members 24 and the optical fiber array 10 or the OIC assembly 19 due to the resilience of the spring members 26.

FIG. 10 shows an interconnection assembly 20 using the retention springs 26, in its assembled configuration. The interconnection assembly 20 has been found to be very reliable particularly at relatively high temperature and humidity conditions under which conventional devices fail. More specifically, because the optical waveguide/optical fiber interface of the interconnection assembly 20 of this invention is not held together with an epoxy as used in conventional devices, the optical waveguide does not tend to separate from the optical fibers under harsh operating conditions due to loss in bonding strength of the epoxy. Because the index matching substance 23 is relatively stable under high temperature and humidity conditions, the interconnection assembly 20 of this invention maintains the optical coupling between the optical waveguides 4 and respective optical fibers 11.

FIG. 11 is a perspective view of a retention spring 26 in accordance with this invention. The view of FIG. 11 is provided for a better understanding of the preferred three-dimensional configuration of the retention spring 26.

Figure 12:
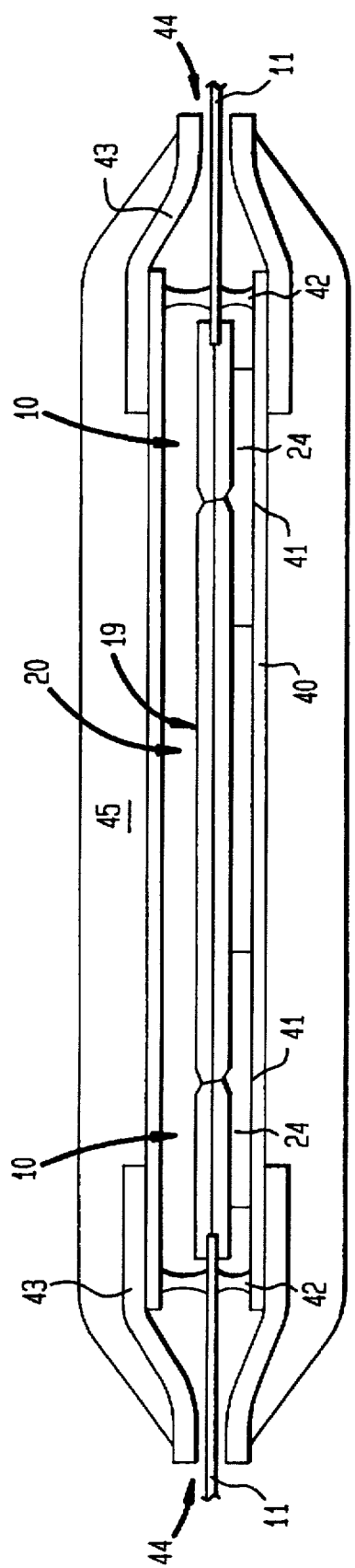
FIG. 12 is a side view of an interconnection assembly.

FIG. 12 is a side view of an interconnection assembly 20 in accordance with this invention. In FIG. 12, it can clearly be seen that portions of the end surfaces 21, 22 that actually abut one another are relatively small due to the beveling of the end surfaces 21, 22. This makes the alignment of the optical waveguides 4 with respective optical fibers 11 relatively easy because relatively large surfaces are likely to have more imperfections that will interfere with alignment of the fibers 11 and the waveguides 4 compared to smaller surfaces, even if the machining used to angle the surfaces 21, 22 is relatively precise. Thus, the beveling of the upper and lower surfaces of the optical fiber array 10 and the OIC assembly 19 at the end surfaces 21, 22 creates a smaller area of contact between the end surfaces 21, 22 so that alignment of the optical waveguides 4 with respective optical fibers 11 in this invention is much easier compared to conventional techniques and devices. The beveling of the end surfaces 21, 22 also creates a reservoir to hold the substance 23 as it cures so that the supply of the substance 23 is sufficient to create a continuous interface between the optical fibers 11 and the optical waveguides 4.

FIG. 13 is an exploded side view of the interconnection assembly 20 illustrating a method of making the interconnection assembly. The optical fiber arrays 10 can be made in a manner as described in FIGS. 1–3 and the OIC assembly 19 can be made in a manner as described in FIGS. 4–8E, for example. The end surfaces 21, 22 of the optical fiber arrays 10 and the OIC assembly 19 are then ground or polished to angles of from 6 to 12 degrees relative to a plane normal to the direction of travel of light between the optical fibers 11 and the optical waveguides 4. The end surfaces 21, 22 are further ground and polished to bevel the upper and lower end surfaces of the optical fiber arrays 10 and the OIC assembly 19. The refractive index matching substances 23 are applied to one or both opposing end surfaces 21, 22 of the optical fiber arrays 10 and the OIC assembly 19 and the optical fiber arrays 10 are joined with respective ends of the OIC assembly 19. Rough alignment of the optical waveguides 4 with respective optical fibers 11 is performed for both optical fiber/optical waveguide interfaces and the substances 23 are cured. The shim substances 25 are applied to surfaces of the bridge members 24 and the bridge members 24 are joined with respective portions of the optical fiber arrays 10 and the OIC assembly 19 so that the shim substances 25 form layers between respective bridge members 24 and portions of the optical fiber arrays 10 and the OIC assembly 19 near respective end surfaces 21, 22. The substances 25 are cured to fix the position of the optical fibers 11 in alignment with the optical waveguides 4 at respective interfaces between the optical fiber arrays 10 and respective ends of the OIC assembly 19. The resulting interconnection assembly 20 is shown in its assembled configuration in FIG. 14.

Figure 15:
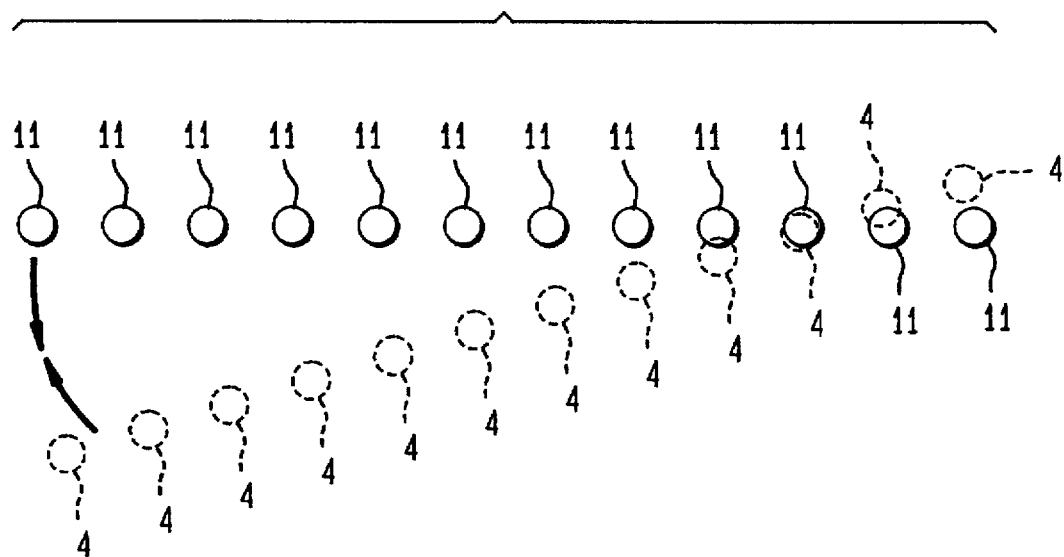
FIG. 15 is a view of a step in a method for aligning the ends of optical fibers to the ends of optical waveguides.
Figure 16:
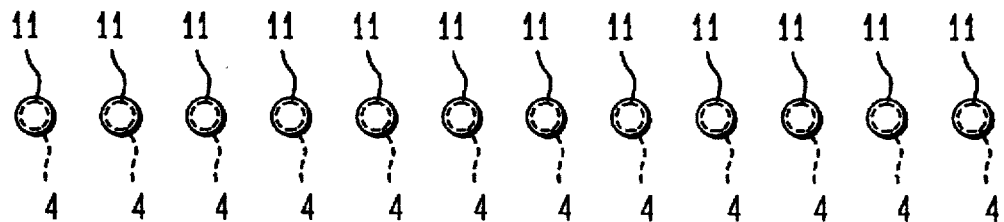
FIG. 16 is a view of the optical fibers and waveguides in an aligned configuration.

FIG. 15 illustrates a preferred manner of aligning the optical fibers 11 of an optical fiber array 10 with the optical waveguides 4 of an OIC assembly 19. In FIG. 15, the circles are the ends of the optical fibers 11 and the optical waveguides 4. Preferably, an optical fiber 11 near one side of the optical fiber array 10 is aligned with a respective optical waveguide 4 by transmitting laser light into only the optical fiber 11 or optical waveguide 4 that are being aligned, and positioning the end of the optical fiber 11 relative to the end of the optical waveguide 4 until the mount of light scattered from the optical fiber/optical waveguide interface is minimized. Laser light is then transmitted into all optical fibers or all optical waveguides 4. Using the aligned optical waveguide 4 and the optical fiber 11 as a pivot axis, the array of fibers 11 are rotated relative to the array of optical waveguides 4 until the light scattered from the interface is minimized, indicating proper alignment of the optical fibers 11 and the optical waveguides 4, as shown in FIG. 16.

Figure 17:
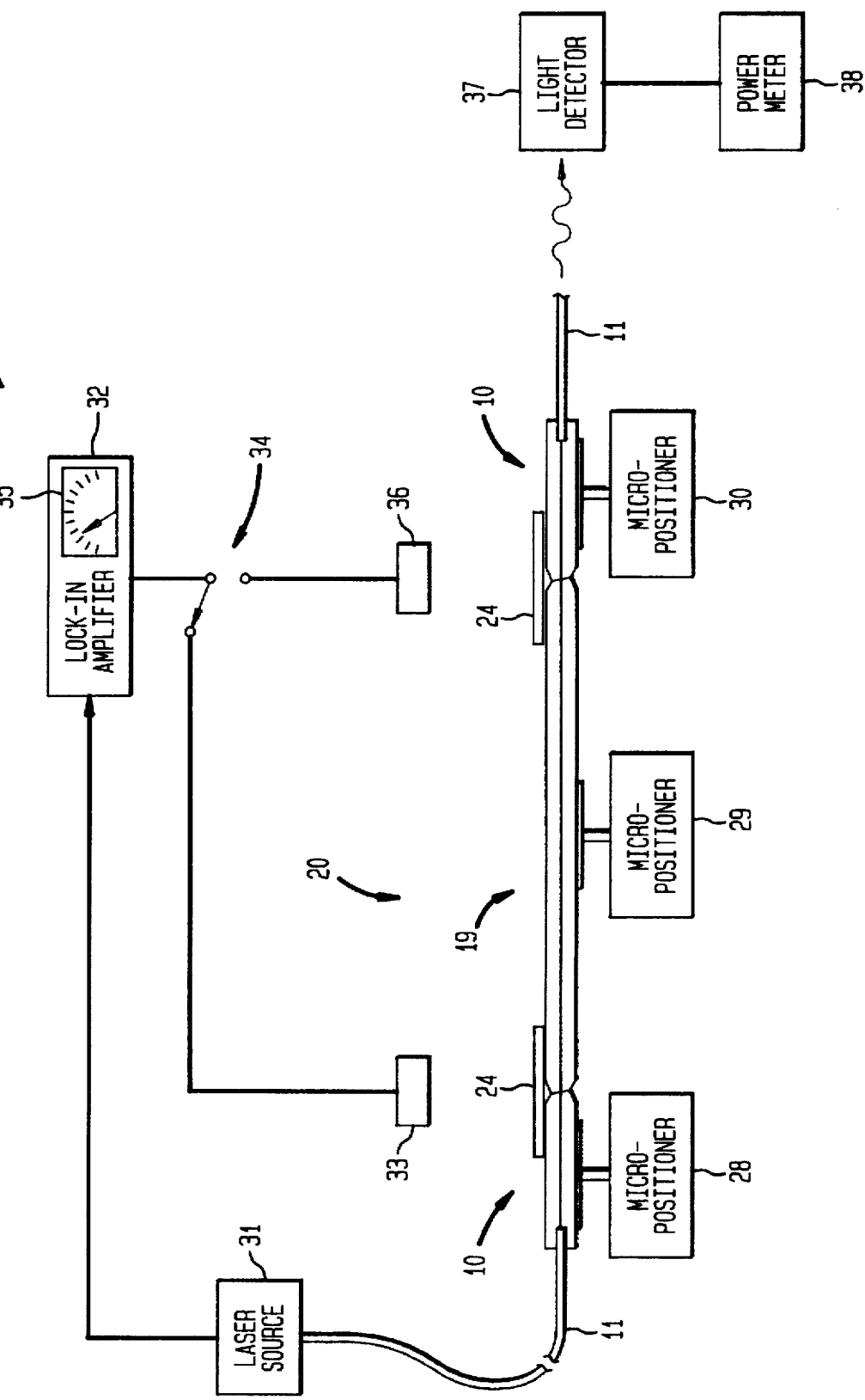
FIG. 17 is a block diagram of an apparatus for aligning the optical fibers with respective optical waveguides in an interconnection assembly.

FIG. 17 is an apparatus 27 for aligning the optical fibers 11 in an optical fiber array 10 with the optical waveguides 4 of the OIC assembly 19. The optical fiber arrays 10 and the OIC assembly 19 are mounted in respective micropositioners 28, 29, 30. The micropositioners 28, 29, 30 can be devices such as those commercially available from Melles-Griot™, Inc. of Cambridge, England. Preferably, the micropositioner 29 is a roll-stage capable of rotating about a horizontal axis extending from the left-hand to right-hand sides of FIG. 17, or, in other words, along an axis parallel with the length of the interconnection assembly 20 in FIG. 17. The micropositioners 28, 30 are preferably x-y-z stages capable of freely positioning respective optical fiber arrays 10 in three-dimensional. A laser source 31 is coupled to the ends of the optical fibers 11 and can selectively generate laser light in any selected optical fiber 11. The laser source 25 intensity-modulates the laser light at a predetermined frequency and generates an electric signal indicative of the modulation frequency of the laser light. The laser source 31 is coupled to provide the electric signal indicating the modulation frequency of the laser light, to a lock-in amplifier 32. The laser light generated by the laser source 31 passes through a selected optical fiber 11 to the optical fiber/index matching substance/optical waveguide interface between the optical fiber array 10 nearest in terms of the optical transmission path to the laser source 25, and the end surface 22 of the OIC assembly 19 contacting this optical fiber array 10. Laser light scattered from the optical fiber/index matching substance/optical waveguide interface is detected by a light detector 33 arranged in proximity to the optical fiber/substance/optical waveguide interface. The light detector 33 generates a signal based on the scattered light that is supplied to the lock-in amplifier 32 via a switch 34 which is set by the operator. Preferably, the laser source 31 modulates the laser light at a frequency which is not significantly present in room light, for example, at a frequency of 2 KHz. The lock-in amplifier 32 receives the signal generated by the laser source 31 and uses this signal to detect only light generated at the modulation frequency of the laser light generated by the source 31. Based on the amount of light scattered from the optical fiber/substance/optical waveguide interface that is detected by the light detector 33, the lock-in amplifier 32 generates a display 35 indicating the amount of scattered light. By manipulating the micropositioners 28, 29 until the light scattered from the optical fiber/substance/optical waveguide interface is a minimum, the selected optical waveguide can be aligned with a respective optical fiber. Preferably, the optical waveguide and fiber selected for alignment are near, but not at, one side of the interconnection assembly 20 as shown in FIG. 15. The switch 34 is then switched to supply the light signal generated by a light detector 36 arranged in proximity to the optical waveguide/substance/optical fiber interface that is furthest, optically speaking, from the laser source 31, to the lock-in amplifier 32. By manipulating the micropositioner 30 until the display 35 indicates that the scattered light is a minimum, the selected optical fiber 11 is aligned with a respective optical waveguide 4. The laser source 31 is then controlled to generate light in all optical fibers 11 and the alignment is maximized for both of the optical fiber/substance/optical waveguide interfaces repeating the above procedure, by using the aligned optical fiber and optical waveguide as a pivot axis and rotating the optical fiber array relative to the optical waveguide array. Once proper alignment of the optical fibers 11 relative to respective waveguides 4 is achieved, the substances 23 are allowed to cure 5. The shim substance 25 is applied to surfaces of the bridge member 24 and/or surfaces of the optical fiber arrays 10 and the OIC assembly 19 near the end surfaces 21, 22 and the bridge members 24 are joined to respective surfaces of the optical fiber arrays 10 and the OIC assembly 19, thus forming shim layers 25 therebetween. Alignment is then repeated for each of the optical fiber/substance/optical waveguide interfaces, preferably using the above described procedure, and the substance 25 is allowed to cure.

Because it is desirable to detect light scattered from the interfaces that passes through the bridge members 24, the bridge members 24 are preferably made of a material such as borosilicate glass or silicon that is transparent to the laser light generated by the source 31. For similar reasons, the substances 23, 25 should be transparent to the laser light.

To provide a measure of the quality or transmissivity of the interconnection assembly 20, optical fibers 11 of the optical fiber array 10 coupled to the side of the interconnection assembly 20 opposite the laser source 31, can be arranged to transmit light to a light detector 37 that generates a signal indicative of the mount of light transmitted through the interconnection assembly. The light detector 37 can be coupled to a power meter 38 that generates a display indicating the mount of light transmitted through the interconnection assembly, based on the signal from the light detector 37. By comparing the display of the power meter 38 with the mount of light transmitted to the interconnection assembly 20 by the laser source 31, a measure of the quality of the interconnection assembly 20 can be determined and indicated with a label attached to the interconnection assembly so that a user of the interconnection assembly will be able to readily determine whether the quality of the interconnection assembly is suitable for a particular application.

Figure 18:
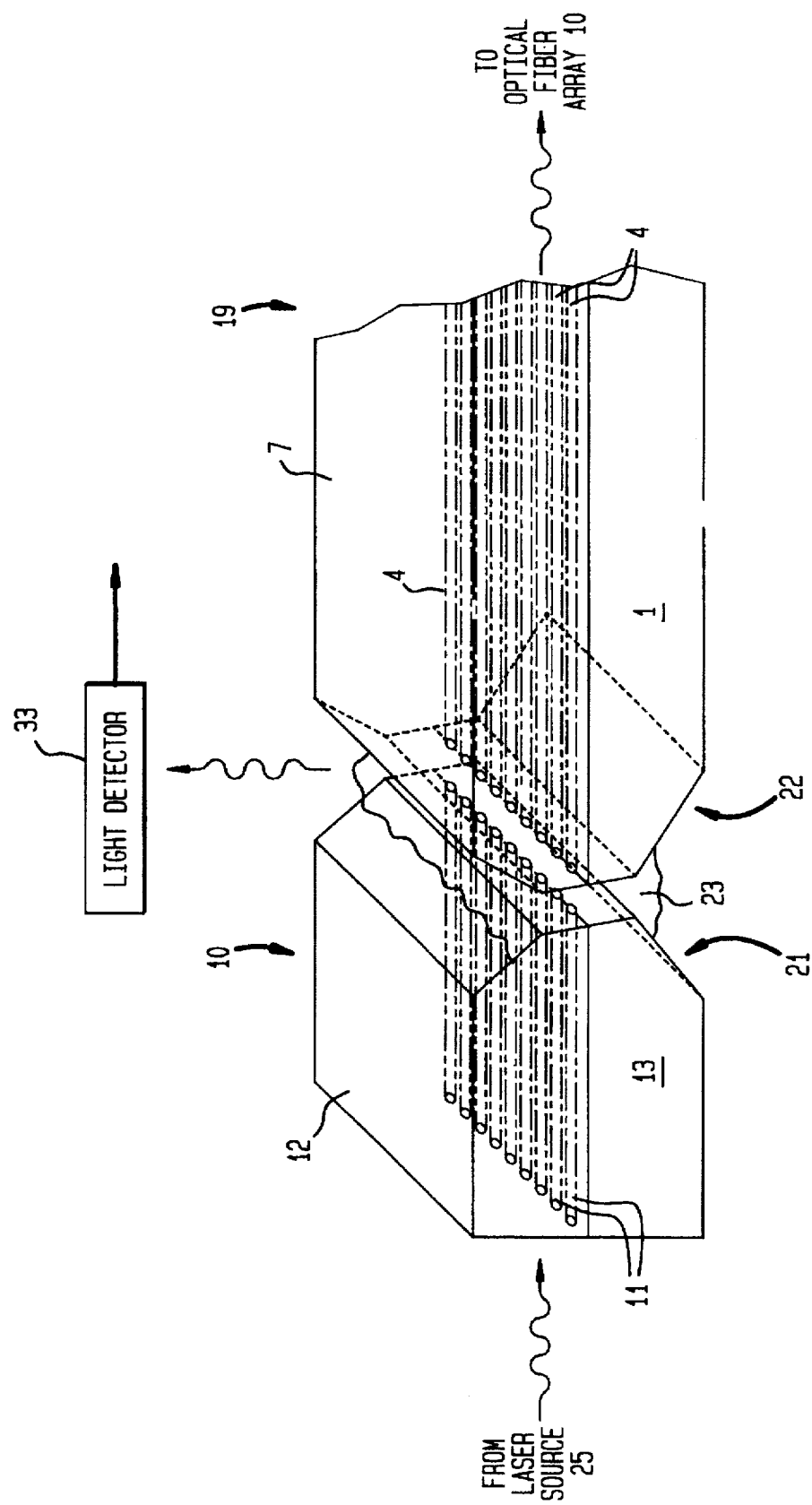
FIG. 18 is a detailed perspective view of an interface in an interconnection assembly.

FIG. 18 is a relatively detailed view of an interface between respective end surfaces 21, 22 of the optical fiber array 10 and the OIC assembly 19, that is provided in this document to provide a better understanding of a typical interface of an interconnection assembly 20 in accordance with this invention.

Figure 19:
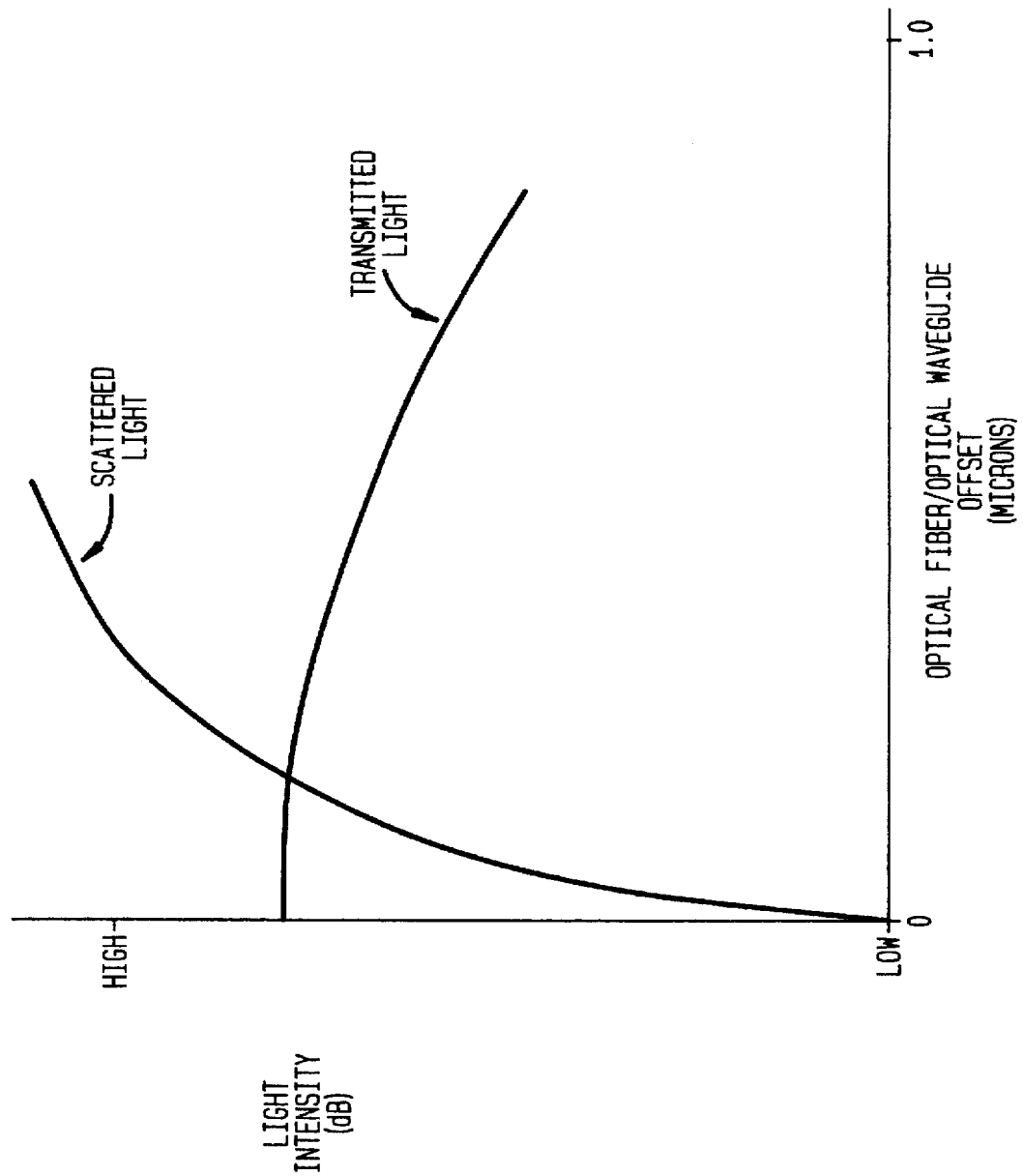
FIG. 19 is a graph of scattered light and transmitted light at an interface of an interconnection assembly.

As shown in FIG. 19, the amount of light scattered from the interface of the interconnection assembly 20 is a much better measure of the alignment of the optical fibers 11 to respective optical waveguides 4 than is the mount of light transmitted through the interface. As shown in FIG. 19, the light scattered from an interface is highly sensitive to even small amounts of offset between the optical waveguides 4 and the optical fibers 11, whereas the light transmitted through the interface is relatively insensitive to the offset between the optical waveguides 4 and the optical fibers 11.

Figure 20:
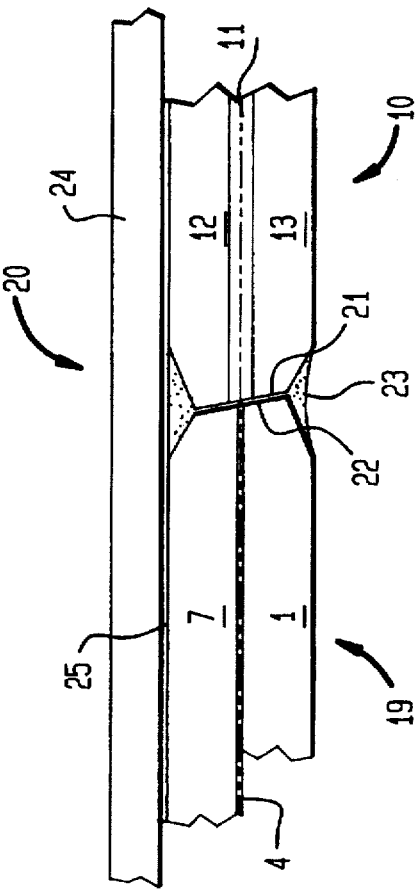
FIG. 20 is a protective assembly for protecting an interconnection assembly of this invention.

FIG. 20 is a cross-sectional view of a protective assembly for the interconnection assembly 20. The optical fibers 11 at one end of the interconnection assembly 20 are inserted and fed through a protective tube 40 until the interconnection assembly 20 is situated inside of the protective tube 40. The protective tube 40 is preferably made of glass or metal, for example, and serves to protect the interconnection assembly from damage due to inadvertent impact or shock, for example. The bridge members 24 are adhered to inner surfaces of the protective tube 40 with respective adhesive layers 41. If the protective tube 40 is made of glass, the adhesive layers 41 can be UV-curable. Sealant plugs 42 formed from silicone sealant, for example, are applied inside the ends of the protective tube 40 to enclose and seal the interconnection assembly 20 inside of the tube. The optical fibers 11 extend through respective sealant plugs 42. Boots 43, preferably made of rubber or other resilient material, define respective apertures 44 through which are inserted the optical fibers 11. The boots 43 are slipped over respective ends of the tube 40. At the outer ends of the boots 43 from which the optical fibers 11 extend from the protective assembly, the apertures 44 defined in the boots 43 constrict into relatively close proximity with the optical fibers 11 and thus the boots 43 confine the fibers 11 to prevent them from being overbent when the fibers 11 are moved relative to the protective assembly. An overmolding 45 is then formed over the protective tube 40 and the boots 43. For example, the overmolding 45 can be formed by dipping the protective tube 40 with its attached boots 43 into a molten plastic material and allowing the plastic material to cure. The resulting assembly shown in cross-section in FIG. 20 is relatively durable and provides significant protection for the interconnection assembly 20. Of course, the protective assembly of FIG. 20 may not be needed for some applications and can be omitted if desired.

In operation, the interconnection assembly 20 of this invention, whether with or without the protective assembly of FIG. 20, is coupled between predetermined devices, depending upon the type of OIC 3 housed in the interconnection assembly. For example, of the OIC 3 is a WDM, dense wavelength division multiplexer (DWDM) or other multiplexer, or switch, the interconnection assembly can be coupled in or between optical transmission switching networks and a telephone, computer or other network, to perform switching of optical signals if the OIC 3 is a 1×N or N×N splitter or taps, an optical signal separated by the 1×N or N×N splitter or taps can be provided to a monitoring apparatus to monitor the quality of signal transmission on a particular optical fiber or channel carried by the optical fiber, without interrupting optical signal transmission or can split an optical fiber to be provided to several destinations such as networks, telephones, computers and/or homes. In addition, the OIC 3 can be a filter to eliminate noise components of an optical signal. Further, the OIC 3 can include a combination of the devices mentioned above.

Although the invention has been described with specific illustrations and embodiments, it will be clear to those of ordinary skill in the art that various modifications may be made therein without departing from the scope of the invention as outlined in the following claims. For example, although the optical fiber array 10 has been described as holding a plurality of optical fibers 11, it may as well be applied to hold only one optical fiber. Also, the optical fiber array 10 may be made of different materials or configured differently than described herein without departing from the scope of the invention. Accordingly, in the following claims, the term 'optical fiber end holder' is intended not only to cover the optical fiber arrays 10, but also other devices that might equivalently be used to mount the end portions of optical fibers for coupling to OIC waveguides. Also, the term 'OIC unit' is used in the following claims not only to include the OIC assembly 19 of this invention, but also to connote any device that houses an OIC with waveguides for coupling to optical fibers. In an additional variation of the invention, more than one bridge member 24 and shim substance 25 can be used to reinforce optical fiber/index matching substance/optical wave guide interface. For example, in FIG. 14, an additional bridge member(s) 24 and shim substance(s) 25 can be applied to the second part 13 and substrate 1 for reinforcement of one or both of the optical fiber/index matching substance/optical waveguide interfaces of FIG. 14. In this case, the spring retention springs 26 can still be used if desired by attaching the springs 26 so that they contact both of the bridge members 24 on respective sides of an optical fiber/index matching substance/optical waveguide interface.

I claim:

1. An apparatus for coupling at least one optical fiber to an optical integrated circuit (OIC), the apparatus comprising:

an optical fibber array (OFA), housing an end portion of at least one optical fiber, and having an end surface at which the end of the at least one optical fiber is exposed and substantially flush with the end surface of OFA;

an OIC assembly having an OIC with at least one integrated optical device and at least one integrated optical waveguide coupled to the at least one integrated optical device, the OIC assembly having an end surface at which the at least one optical waveguide is exposed and substantially flush with the end surface of the OIC assembly, the end surface of the OIC assembly arranged to oppose the end surface of the OFA;

a bridge member positioned to overlap a portion of the OFA and a portion of the OIC assembly; and a shim layer in contact with a surface of the bridge member and in contact with respective surfaces of the OFA and the OIC assembly that are transverse to respective end surfaces of the OFA and the OIC assembly, the shim layer fixing the position of the OFA relative to the bridge member and the position of the OIC assembly relative to the bridge member so that the end of the optical fiber is substantially aligned with the end of the optical waveguide.

2. An apparatus as claimed in claim 1, further comprising:

a refractive index matching substance disposed between and in contact with the end surfaces of the OFA and the OIC assembly, and having a refractive index substantially matched to respective refractive indices of the optical fiber and the optical waveguide.

3. An apparatus as claimed in claim 2, wherein the index matching substance is a curable substance having an uncured, liquid state to allow rough alignment of the ends of the optical fiber and the optical waveguide, and a cured state in which the index matching substance is tacky and adheres to the ends of the OIC assembly and the OFA, the index matching substance having a relatively low modulus of elasticity in its cured state to allow for free adjustment of the alignment of the optical fiber and optical waveguide ends.

4. An apparatus as claimed in claim 2, wherein the index matching substance is thermally curable and wherein the index matching substance is tacky and polymerized when cured.

5. An apparatus as claimed in claim 1, wherein the bridge member, the OFA and OIC assembly have substantially similar thermal coefficients of expansion.

6. An apparatus as claimed in claim 1, wherein the shim layer is composed of a curable substance with relatively little shrinkage between its uncured, liquid state and its cured, solid state that fixes the position of the OFA and OIC assembly relative to the bridge member.

7. An apparatus as claimed in claim 6, wherein the shim layer is filled with silica or silicon, and said curable substance is heat-curable and adhesive.

8. An apparatus as claimed in claim 1, wherein the shim layer adheres the bridge member to the OFA and OIC assembly.

9. An apparatus as claimed in claim 1, further comprising:
a fast retention spring clamping together the OFA and the bridge member.

10. An apparatus as claimed in claim 9, further comprising:
a second retention spring clamping together the OIC assembly and the bridge member.

11. An apparatus as claimed in claim 1, further comprising:
a retention spring clamping together the OIC assembly and bridge member.

12. An apparatus as claimed in claim 1, further comprising:
a protective tube inside of which the OFA, the OIC assembly and the bridge member are positioned so that the optical fiber extends out of an open end of the tube;
an adhesive fixing the OFA, the OIC assembly and the bridge member in the protective tube;
a sealant plug situated inside of the tube and enclosing the open end of the tube, the optical fiber extending through the sealant plug;
a boot fixed to the end of the protective tube, the boot defining aperture through which the optical fiber extends, the boot confining the optical fiber to prevent overbending of the optical fiber; and
an overmolding formed of plastic material surrounding and in contact with the boot and protective tube.

13. An apparatus as claimed in claim 1, wherein the OFA includes first and second parts and an adhesive that holds the first and second parts together, the end portion of the optical fiber being situated between the first and second parts.

14. An apparatus as claimed in claim 13, wherein the OIC assembly includes a substrate on which the OIC is formed, a protective plate joined to a side of the substrate on which the OIC is formed, and an adhesive situated between the substrate and the protective plate, that holds the substrate and the protective plate together.

15. An apparatus as claimed in claim 1, wherein the end surfaces of at least one of the OFA and the OIC assembly are beveled.

16. An apparatus as claimed in claim 1, wherein the end surfaces of the OIC assembly and the OFA are angled relative to a plane normal to the direction of travel of light between the respective ends of the optical fiber and the optical waveguide.

17. An apparatus for coupling an optical fiber end holders, housing an end portion of at least one optical fiber, to an optical integrated circuit unit having at least one integrated optical device and at least one integrated optical waveguide coupled to the optical device, the apparatus comprising:
a first bridge member situated to extend across an interface between an end surface of the holder and an end surface of the unit, the end surface of the holder exposing the end of the optical fiber which is substantially flush with the end surface of the holder, and the end of the unit exposing an end of the optical waveguide which is substantially flush with the end surface of the unit; and
a first shim layer having a first side in contact with the first bridge member and a second side in contact with the holder and the unit, for fixing the position of holder and unit relative to the first bridge member so that the ends of the optical fiber and waveguide are substantially aligned.

18. An apparatus as claimed in claim 17, further comprising:
a refractive index matching substance situated between and in contact with the end surfaces of the holder and unit, the index matching substance having a refractive index substantially similar to respective refractive indices of the optical fiber and waveguide.

19. An apparatus as claimed in claim 17, wherein the index matching substance is a curable substance having an uncured, liquid state to allow rough alignment of the ends of the optical fiber and the optical waveguide, and a cured, solid state in which the index matching substance is tacky and adheres to the ends of the unit and the holder, the index matching substance having a relatively low modulus of elasticity in its cured state to allow for fine adjustment of the alignment of the optical fiber and optical waveguide ends.

20. An apparatus as claimed in claim 17, wherein the first bridge member, the holder and the unit have substantially similar thermal coefficients of expansion.

21. An apparatus as claimed in claim 17, wherein the first shim layer adheres the first bridge member to the holder and the unit.

22. An apparatus as claimed in claim 17, further comprising:
a first retention spring clamping together the holder and the first bridge member.

23. An apparatus as claimed in claim 22, further comprising:
a second retention spring clamping together the unit and the first bridge member.

24. An apparatus as claimed in claim 17, further comprising:
a retention spring clamping together the holder and the first bridge member.

25. An apparatus as claimed in claim 17, wherein the end surfaces of at least one of the holder and the unit are beveled.

26. An apparatus as claimed in claim 17, wherein the end surfaces of the holder and the unit are angled with respect to a plane normal to a direction of travel of light between the end surfaces of the holder and the unit.

27. An apparatus as claimed in claim 17, further comprising:

a second bridge member situated to extend across the end surface of the holder and the end surface of the unit; and a second shim layer having a first side in contact with the second bridge member, and a second side in contact with respective potions of the holder and the unit different from the respective potions of the holder and the unit contacted by the first shim layer.

28. An apparatus as claimed in claim 27, further comprising:

a first retention spring in contact with the first and second bridge members on one side of the interface.

29. An apparatus as claimed in claim 28, further comprising:

a second retention spring in contact with the first and second bridge members on the other side of the interface.

* * * * *